(12) United States Patent
Moffatt et al.

(10) Patent No.: US 10,044,230 B2
(45) Date of Patent: Aug. 7, 2018

(54) INTEGRATED POWER TRANSMITTER FOR WIRELESS POWER TRANSFER

(71) Applicants: Robert A Moffatt, Palo Alto, CA (US); Jeffrey J Yen, Palo Alto, CA (US)

(72) Inventors: Robert A Moffatt, Palo Alto, CA (US); Jeffrey J Yen, Palo Alto, CA (US)

( * ) Notice: Subject to any disclaimer, the term of this patent is extended or adjusted under 35 U.S.C. 154(b) by 0 days.

(21) Appl. No.: 15/644,802

(22) Filed: Jul. 9, 2017

(65) Prior Publication Data

US 2018/0109144 A1 Apr. 19, 2018

Related U.S. Application Data

(63) Continuation-in-part of application No. 15/296,704, filed on Oct. 18, 2016.

(51) Int. Cl.
| | |
|---|---|
| H01F 27/42 | (2006.01) |
| H01F 37/00 | (2006.01) |
| H01F 38/00 | (2006.01) |
| H02J 50/12 | (2016.01) |
| H04B 5/00 | (2006.01) |

(52) U.S. Cl.
CPC ............ *H02J 50/12* (2016.02); *H04B 5/0037* (2013.01); *H04B 5/0081* (2013.01)

(58) Field of Classification Search
CPC .. H02J 50/12; H02J 50/40; H02J 5/005; H02J 7/025; H02J 17/00; H04B 5/0037; H04B 5/0081; H01F 38/14
USPC ........................................................ 307/104
See application file for complete search history.

(56) References Cited

U.S. PATENT DOCUMENTS

2004/0108311 A1* 6/2004 de Rooij .............. H05B 6/1245
219/624
2014/0292103 A1* 10/2014 Waffenschmidt .... H04B 5/0012
307/109

* cited by examiner

*Primary Examiner* — Carlos Amaya
(74) *Attorney, Agent, or Firm* — Thomas | Horstemeyer, LLP

(57) ABSTRACT

A power transmitter for wireless power transfer. The power transmitter includes (i) a material sheet encompassing a path based on a wireless power transfer area, and (ii) capacitors and inductive segments disposed along the path, mechanically supported by the material sheet, and connected in series into a string of distributed capacitors. Accordingly, the power transmitter is configured to transmit, from a RF power source and based at least in part on a characteristic frequency of the string of distributed capacitors, RF power across the wireless power transfer area via a near electromagnetic field of the string of distributed capacitors.

20 Claims, 20 Drawing Sheets

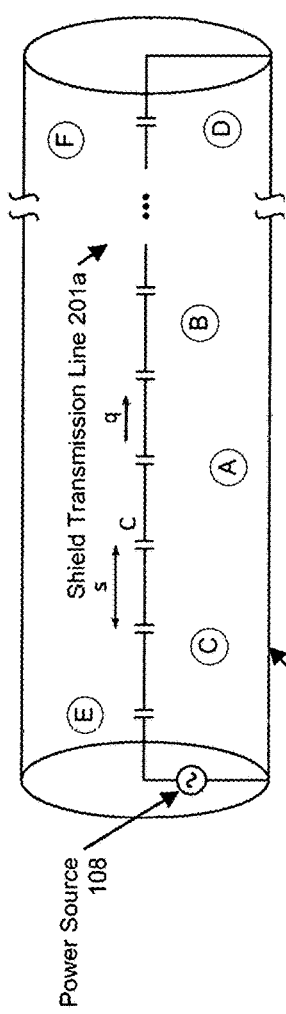
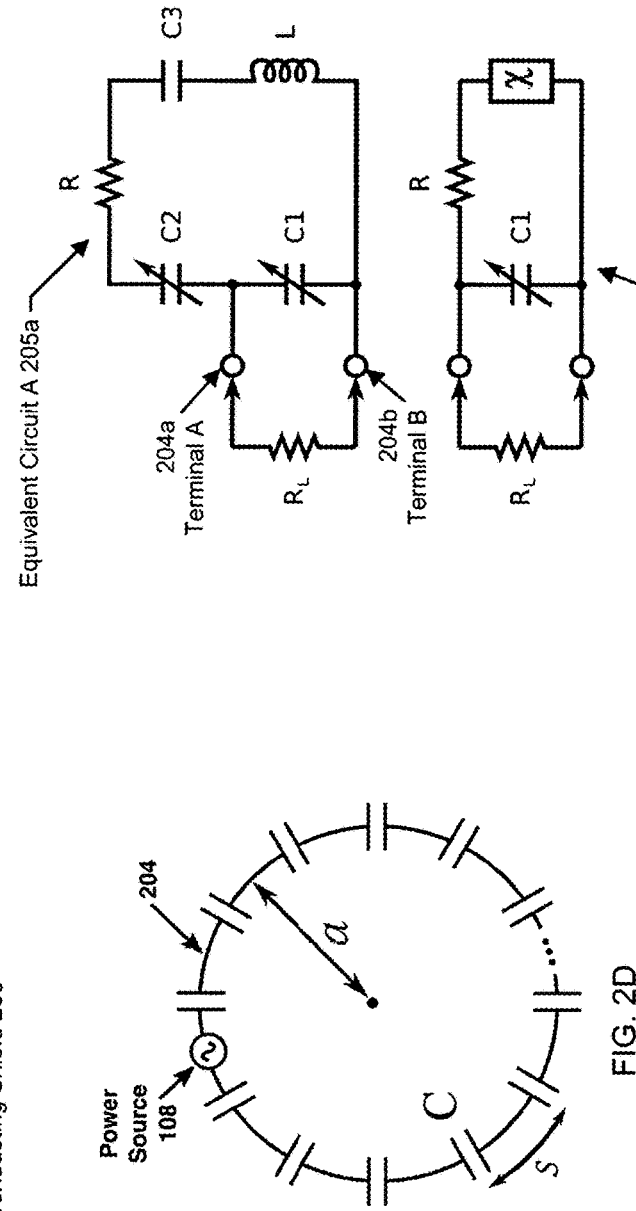
FIG. 2C
FIG. 2D
FIG. 2H

Quality Factor of a Parallel-Wire Transmission Line Resonator as a Function of Wire Separation

INTEGRATED POWER TRANSMITTER FOR WIRELESS POWER TRANSFER

BACKGROUND

Wireless power transfer is the transmission of electrical energy from a power source to an electrical load without the use of man-made conductors to connect the power source to the electrical load. A wireless power transfer system consists of a transmitter and one or more receiver devices. The transmitter is connected to a source of power and converts the power to a time-varying electromagnetic field. The one or more receiver devices receive the power via the electromagnetic field and convert the received power back to an electric current to be utilized by the electrical load.

SUMMARY

In general, in one aspect, the invention relates to a power transmitter for wireless power transfer. The power transmitter includes a material sheet encompassing at least a path based on a wireless power transfer area, a number of capacitors disposed along the path, and a number of inductive segments disposed along the path. The capacitors are connected in series via at least the inductive segments into a string of distributed capacitors, where a capacitor includes a first conductive strip and a second conductive strip attached to a first surface and a second surface, respectively, of the material sheet, wherein an inductive segment includes a third conductive strip attached to the first surface, and where the power transmitter is configured to transmit, from a radio frequency (RF) power source and based at least in part on a characteristic frequency of the string of distributed capacitors, RF power across the wireless power transfer area via a near electromagnetic field of the string of distributed capacitors.

In general, in one aspect, the invention relates to a system for wireless power transfer. The system includes a physical object associated with a wireless power transfer area, a radio frequency (RF) power source, a material sheet mechanically supported by the physical object and encompassing at least a path along a contact surface of the physical object, a number of capacitors disposed along the path, and a number of inductive segments disposed along the path. The capacitors are connected in series via at least the inductive segments into a string of distributed capacitors, where a capacitor includes a first conductive strip and a second conductive strip attached to a first surface and a second surface, respectively, of the material sheet, wherein an inductive segment includes a third conductive strip attached to the first surface, and where the power transmitter is configured to transmit, from a radio frequency (RF) power source and based at least in part on a characteristic frequency of the string of distributed capacitors, RF power across the wireless power transfer area via a near electromagnetic field of the string of distributed capacitors.

Other aspects of the invention will be apparent from the following transaction description and the appended claims.

BRIEF DESCRIPTION OF DRAWINGS

FIGS. 2A, 2B, 2C, 2D, 2E, 2F, 2G, 2H, 2J, 2K, 2L, 2M, 2N, and 2P show various diagrams for illustrating an example variable form factor transmitter in accordance with one or more embodiments of the invention.

DETAILED DESCRIPTION

Figure 1A:
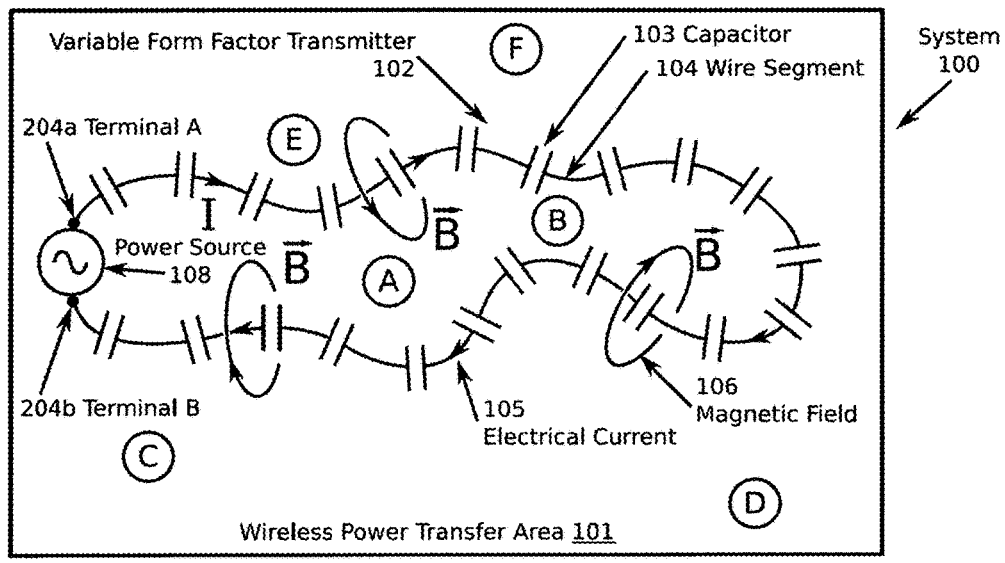
FIGS. 1A, 1B, and 1C show schematic diagrams of an example system having a variable form factor transmitter in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a transmitter device, and a system for wireless power transfer. In one or more embodiments of the invention, the method, transmitter device, and system is based on a power transmitter that includes a number of capacitors and inductive segments disposed along a path that defines a wireless power transfer area. The capacitors are connected in series via at least the inductive segments into a string of distributed capacitors. In one or more embodiments of the invention, the string of distributed capacitors is integrated onto a laminated material sheet (e.g., including at least dielectric material) encompassing at least the path that defines the power transfer area. In one or more embodiments, one or more capacitors and one or more inductive segments are constructed using conductive strips attached to two opposing surfaces of the material sheet. For example, a capacitor may include two conductive strips attached to the two opposing surfaces. Further, an inductive segment may include another conductive strip attached to one of the two opposing surfaces. Accordingly, RF power is transmitted, from a radio frequency (RF) power source and based at least on a characteristic frequency of the string of distributed capacitors, across the wireless power transfer area via a near electromagnetic field of the string of distributed capacitors. In one or more embodiments of the invention, the characteristic frequency is within the industrial, scientific and medical (ISM) radio band defined by the International Telecommunication Union (ITU) Radio Regulations. For example, the characteristic frequency may be within the type A frequency range (i.e., 6.765 MHz-6.795 MHz) defined in the ITU Radio Regulations Article 5, footnote 5.138.

In one or more embodiments of the invention, the power transmitter has a fixed form factor specific to a pre-determined wireless power transfer area. In one or more embodiments of the invention, the power transmitter is adaptable into different form factors (referred to as adapted form factors) to fit different wireless power transfer areas. In such embodiments, the power transmitter is a variable form factor transmitter with a characteristic frequency that is maintained to be substantially independent of the adapted form factors. For example, the characteristic frequency may be maintained, as the adapted form factor varies, within the ISM radio band.

FIG. 1A shows a schematic diagram of an example system (100) in accordance with one or more embodiments of the invention. In one or more embodiments, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, the system (100) includes a variable form factor transmitter (102) receiving power from an RF power source (108) for wireless power transfer across a wireless power transfer area (101) having one or more receiver devices (e.g., denoted as circular icons labeled as A, B, C, D, E, and F) disposed therein. Each of these components is described in detail below.

In one or more embodiments of the invention, the wireless power transfer area (101) is any three dimensional (3D) physical space where the one or more receiver devices are receiving power from the variable form factor transmitter (102). For example, the wireless power transfer area (101) may include a 3D space within a building or a vehicle, such as a room, a hallway, a passenger cabin of a car, bus, train, airplane, or space ship, or any portion of the building or vehicle. In another example, the wireless power transfer area (101) may include a 3D space that is not enclosed, such as a play ground, a roadway, an amusement park, or any type of field on the ground, above the ground, or away from the earth in the space (e.g., an atmospheric layer or interstellar space). In yet another example, the wireless power transfer area (101) may include an underground or under-water space, such as a cave, an under water region near an ocean platform or sea bed, etc. In still another example, the wireless power transfer area (101) may include a combination of the examples above.

In one or more embodiments of the invention, the variable form factor transmitter (102) is disposed entirely within the wireless power transfer area (101), overlaps the wireless power transfer area (101), or in the vicinity of the wireless power transfer area (101). In one or more embodiments, at least a portion of the variable form factor transmitter (102) may be inserted in a protective sleeve, embedded in a material sheet, free-standing in the wireless power transfer area (101), or attached to the wireless power transfer area (101). In one or more embodiments, at least a portion of the variable form factor transmitter (102) may be stationery or moving with respect to the wireless power transfer area (101) and/or the one or more receiver devices (e.g., denoted as circular icons labeled as A, B, C, D, E, and F) disposed therein. In one or more embodiments of the invention, the form factor of the variable form factor transmitter (102) is adapted according to a geometric constraint imposed by the wireless power transfer area (101). For example, the variable form factor transmitter (102) may be made of pliable material such that the form factor of the variable form factor transmitter (102) is changed by the user to fit the physical shape of the room, hallway, passenger cabin, play ground, roadway, amusement park, field, cave, under-water region, etc. of the wireless power transfer area (101). In this context, the form factor of the variable form factor transmitter (102) is based on the wireless power transfer area (101). For example, the form factor of the variable form factor transmitter (102) may include a 3D portion, such as a curved surface, a helical curve, etc.

In one or more embodiments of the invention, the receiver devices (A) through (F) may be of the same type or of different types that are used by one or more users, such as individual persons. In one or more embodiments, one or more of the receiver devices (A) through (F) are disposed at user specified locations throughout the wireless power transfer area (101) and are stationary during the wireless power transfer. In one or more embodiments, one or more of the receiver devices (A) through (F) have dimensions that are smaller than the dimensions of the wireless power transfer area (101). In one or more embodiments, one or more of the receiver devices (A) through (F) have dimensions that are comparable to or greater than the dimensions of the wireless power transfer area (101). For example, the receiver device (A) may be a lighting device placed on the ceiling of a room or hallway by the user. In one or more embodiments, one or more of the receiver devices (A) through (F) are carried by respective users who move around throughout the wireless power transfer area (101) from time to time during the wireless power transfer. Based on the nature of the near electromagnetic field of the variable form factor transmitter (102), the power of the near electromagnetic field that is not received by any of the receiver device is returned to the variable form factor transmitter (102) and the RF power source (108). This is in contrast to a far electromagnetic field via which power is radiated resulting in energy loss that is not productive for the wireless power transfer. Examples of the receiver device (A), receiver device (B), receiver device (C), receiver device (D), receiver device (E), and receiver device (F) are described in reference to FIGS. 5A, 5B, 5C, 5D, and 5E below.

In one or more embodiments of the invention, the variable form factor transmitter (102) includes a string of distributed capacitors. In particular, the string of distributed capacitors includes multiple capacitor-wire segments that are connected in series to conduct radio-frequency (RF) electrical current (105) generated by the power source (108). The RF electrical current (105) induces magnetic fields (e.g., magnetic field (106)) that are present throughout the wireless power transfer area (101). In one or more embodiments, the string of distributed capacitors is disposed along a path such that the magnetic fields throughout the wireless power transfer area (101) exceeds a threshold that is based on a power requirement of the receiver devices. In this context, the path is based on the wireless power transfer area (101). In one or more embodiments, the RF electrical current (105) enters/exits the wire at a terminal A (204a) and a terminal B (204b). In one or more embodiments, additional intervening components (not shown) may also be inserted in the series of capacitor-wire segments or inserted between the series of capacitor-wire segments and one or more terminals (e.g., terminal A (204a), terminal B (204b)) without impeding the operation of the variable form factor transmitter (102).

In one or more embodiments, each capacitor-wire segment includes a capacitor (e.g., capacitor (103)) connected to a wire segment (e.g., wire segment (104)). In one or more embodiments, each capacitor (e.g., capacitor (103)) in the variable form factor transmitter (102) has the same nominal capacitance value, as any other capacitor therein, that is determined prior to disposing the variable form factor transmitter (102) in the wireless power transfer area (101). For example, the capacitors (e.g., capacitor (103)) in the variable form factor transmitter (102) may be installed in a factory before a user uses the variable form factor transmitter (102) to provide power wirelessly within the wireless power transfer area (101). The capacitors (e.g., capacitor (103)) may be of a suitable type, such as ceramic capacitors, film and paper capacitors, electrolyte capacitors, polymer capacitors, silver mica capacitors, etc. In one or more embodiments, one or more of the capacitors may include two aluminum or other metallic sheets, foils, or films separated by an aluminum or other metallic oxide layer. As is typical in a factory manufacturing process, the capacitance values of all capacitors (e.g., capacitor (103)) in the variable form factor transmitter (102) may vary within a range (referred to as a capacitance range), e.g., due to a manufacturing tolerance.

In one or more embodiments, each capacitor-wire segment includes a wire segment having a pre-determined segment length and a pre-determined inductance per unit length. For example, the wire segments (e.g., wire segment (104)) in the variable form factor transmitter (102) may be installed in a factory before a user uses the variable form factor transmitter (102) to provide power wirelessly within the wireless power transfer area (101). The wire segments (e.g., wire segment (104)) may be of a suitable type, such as insulated or un-insulated wires, sheets, foil, or films made of copper, aluminum, or other suitable metal and/or alloy material. In one or more embodiments, one or more of the wire segments (e.g., wire segment (104)) are flexible or pliable such that the user may bend, stretch, or otherwise change the shape of the one or more wire segments. As is typical in a factory manufacturing process, the length and inductance values of each and all wire segments (e.g., wire segment (104)) in the variable form factor transmitter (102) may vary within a range (referred to as a length range and an inductance range), e.g., due to a manufacturing tolerance.

In one or more embodiments of the invention, by confining the electrical fields, the capacitors (e.g., capacitor (103)) in the variable form factor transmitter (102) reduce stray electric fields and the resultant induced voltage of the wire segments (e.g., wire segment (104)). Accordingly, the capacitors (e.g., capacitor (103)) in the variable form factor transmitter (102) reduce the fraction of energy stored in the stray capacitance of the wire segments (e.g., wire segment (104)) over the total energy in the system (100). The reduction of both induced voltage and stored energy associated with the stray capacitance reduces loss due to environmental interactions and improves safety for the user.

In one or more embodiments of the invention, the variable form factor transmitter (102) is associated with a characteristic frequency that is based at least on the pre-determined capacitance, the pre-determined segment length, and the pre-determined inductance per unit length. The characteristic frequency of the variable form factor transmitter (102) is described in reference to FIGS. 2A, 2B, 2D, 2E, 3A, 3B, 3C, 3D, and 3E below. Throughout this document, the terms "characteristic frequency" and "resonant frequency" may be used interchangeably depending on context.

Figure 1B:
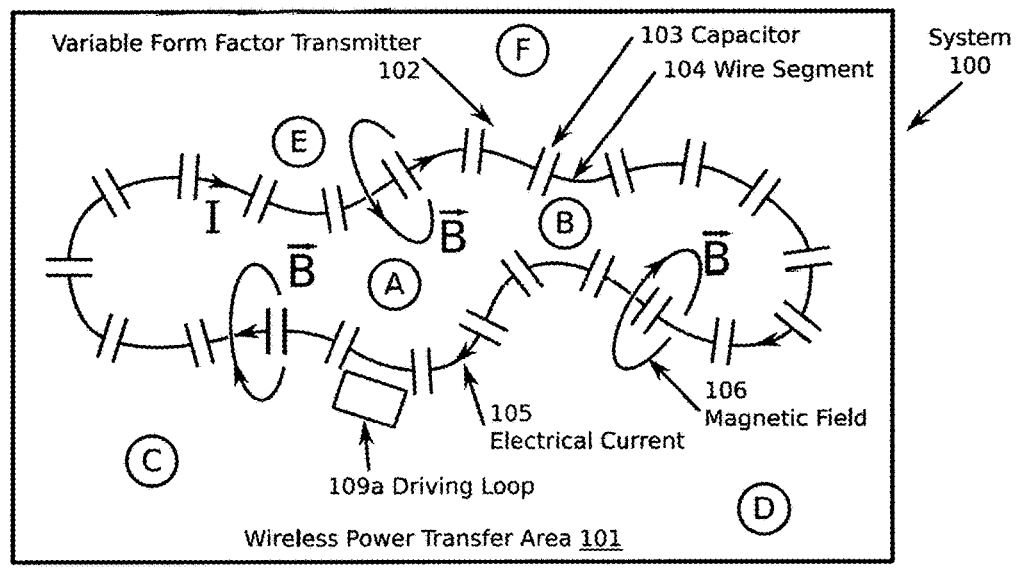

In one or more embodiments, instead of the direct connection to the power source (108), the variable form factor transmitter (102) receives power from the power source (108) using inductive coupling via a driving loop (109a). FIG. 1B shows a schematic diagram of the example system (100) in the inductive coupling power configuration. Details of receiving power via the driving loop (109a) are described in reference to FIG. 1C below.

Figure 1C:
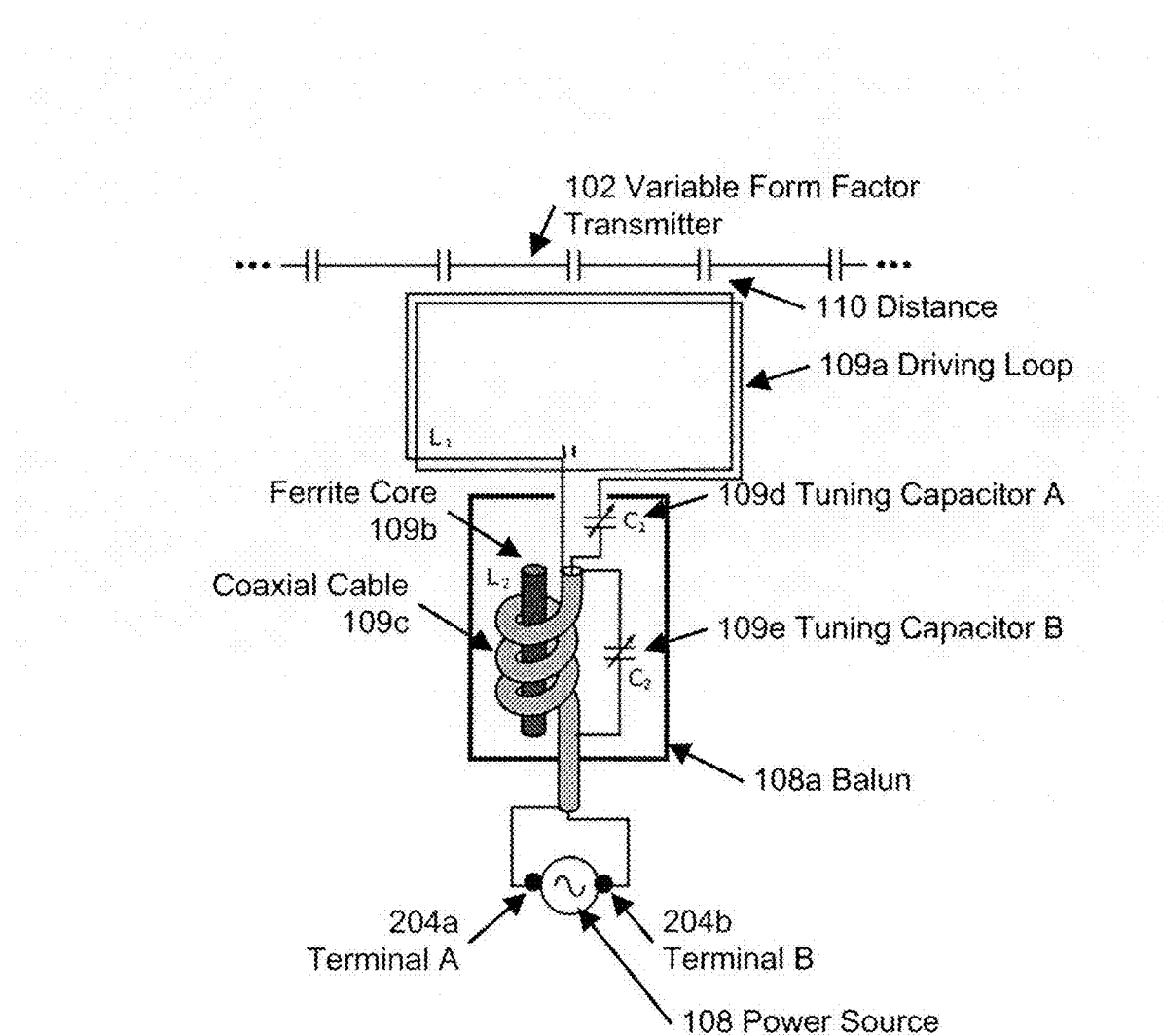

FIG. 1C shows a schematic diagram of supplying power via the driving loop (109a) depicted in FIG. 1B above. In one or more embodiments, one or more of the modules and elements shown in FIG. 1C may be omitted, repeated, and/or substituted. Accordingly, embodiments of the invention should not be considered limited to the specific arrangements of modules shown in FIG. 1C.

As shown in FIG. 1C, the driving loop (109a) includes one or more loops of conducting wire (e.g., having an inductance $L_1$) that are coupled to the power source (108) via a balun (108a). The balun (108a) includes a tuning capacitor A (109d) (e.g., having a variable capacitance $C_1$), a tuning capacitor B (109e) (e.g., having a variable capacitance $C_2$), and a coaxial cable (109c) (e.g., coiled around a ferrite core (109b) and having an inductance $L_2$). Specifically, the driving loop (109a) is placed at distance (110) from the variable form factor transmitter (102) such that the power source (108) supplies power to the variable form factor transmitter (102) via electromagnetic coupling across the distance (110). In one or more embodiments, the tuning capacitor B (109e) is tuned to resonate with inductance $L_2$ of the ferrite core (109b) to form a parallel resonant LC circuit, which imposes a high impedance between the two opposite ends of the coaxial cable (109c). Further, the tuning capacitor A (109d) is used to tune the resonant frequency of the driving loop (109a) to match the frequency of the RF power source (108). The distance (110) between the driving loop (109a) and the variable form factor transmitter (102) may be adjusted in order to match the apparent input impedance of variable form factor transmitter (102) to the impedance of the coaxial cable (109c), and the output impedance of the RF power source (108).

Figure 2A:
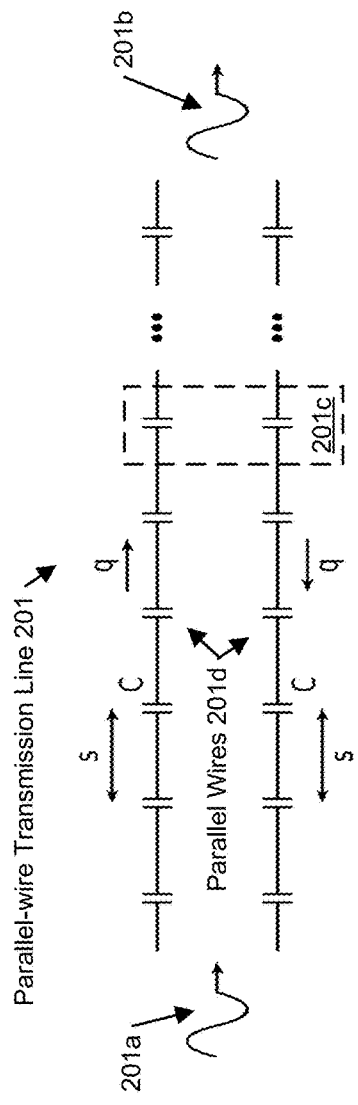

FIG. 2A shows a schematic diagram of a parallel-wire transmission line (201) in accordance with one or more embodiments of the invention. In one or more embodiments, one or more of the modules and elements shown in FIG. 2A may be omitted, repeated, and/or substituted. Accordingly, embodiments of the invention should not be considered limited to the specific arrangements of modules shown in FIG. 2A.

As shown in FIG. 2A, the sinusoid-shaped icons (201a) and (201b) represent electromagnetic waves propagating along the parallel-wire transmission line (201). The parallel-wire transmission line (201) is composed of two parallel wires (201d) each having wire segments joined by capacitors, where s denotes the length of each wire segment, C denotes the capacitance of each capacitor, and q denotes the electric charge displacement along the parallel-wire transmission line (201). In the context that the two parallel wires (201d) conduct RF current (e.g., electrical current (105) depicted in FIG. 1A), each wire of two parallel wires (201d) is also referred to as a conductor wire throughout this document. The distance between the sinusoid-shaped icons (201a) and (201b) corresponds to the length of the parallel-wire transmission line (201) while the spacing between the two parallel string of capacitors corresponds to the width of the parallel-wire transmission line (201). While the length of the parallel-wire transmission line (201) may be comparable to a length of other dimension of the wireless power transfer area (101), the width of the parallel-wire transmission line (201) may range from less than one centimeter to a width or other dimension of the wireless power transfer area (101). In one or more embodiments, the parallel-wire transmission line (201) corresponds to a portion of the variable form factor transmitter (102) depicted in FIG. 1A above. In other words, two sections of the string of distributed capacitor depicted in FIG. 1A may be disposed parallel to each other. Generally, the electric charge, q, displaced along the parallel-wire transmission line (201) is a function of a position along the parallel-wire transmission line (201) and time. The corresponding charge density (i.e., electric charge per unit length), $\rho_\lambda$, and electrical current, I, are given by Eq. (1) below for the parallel-wire transmission line (201). In Eq. (1), x and t denote the position along the parallel-wire transmission line (201) and time, respectively.

$$\rho_\lambda = q' = \frac{\partial q}{\partial x}, I = \dot{q} = \frac{\partial q}{\partial t} \qquad \text{Eq. (1)}$$

TABLE 1 shows additional definitions of variables used in the equations throughout this document.

TABLE 1 c = capacitance per unit length
l = inductance per unit length
C = capacitance of each joining capacitor
s = length of each segment
q = charge displacement
$\rho_\lambda$ = charge density
$\lambda$ = wavelength in free space
I = current
$U_j$ = energy stored in the two joining capacitors
$u_E$ = electrical energy stored per unit length
$u_B$ = magnetic energy stored per unit length
v = asymptotic velocity
$\omega_0$ = cutoff frequency
$v_p$ = phase velocity
$v_g$ = group veloctiy The electrical energy, $U_j$, stored in a pair of adjoining capacitors (e.g., capacitor pair (201c)) in the parallel-wire transmission line (201) is given by Eq. (2) below.

$$U_j = 2 \cdot \frac{1}{2} \frac{q^2}{C} = \frac{q^2}{C} \qquad \text{Eq. (2)}$$

In the scenario where s is substantially less than the spatial variation of q, the stored energy, $U_j$, divided by the segment length, s, may be considered as a density of energy stored in the capacitors, C, along the parallel-wire transmission line (201). Let c denote the stray capacitance per unit length between the two parallel wires of the parallel-wire transmission line (201). The total electrical energy, $u_E$, stored per unit length along the parallel-wire transmission line (201) is given by Eq. (3) below.

$$u_E = \frac{1}{2} \frac{\rho_\lambda^2}{C} + \frac{q^2}{sC} \qquad \text{Eq. (3)}$$

The total magnetic energy, $u_B$, stored per unit length along the parallel-wire transmission line (201) is given by Eq. (4) below.

$$u_B = \tfrac{1}{2} l I^2 \qquad \text{Eq. (4)}$$

Accordingly, the Lagrangian of the parallel-wire transmission line (201) is given by Eq. (5) below.

$$\mathcal{L} = U_E - U_B = \int dx (\mathcal{U}_E - \mathcal{U}_B) \qquad \text{Eq. (5)}$$

$$= \int dx \left[ \frac{1}{2} \frac{\rho_\lambda^2}{C} + \frac{q^2}{sC} - \frac{1}{2} l I^2 \right]$$

$$= \int dx \left[ \frac{-1}{2} q \frac{q''}{C} + \frac{q^2}{sC} - \frac{1}{2} l \dot{q}^2 \right]$$

The generalized momentum $\pi$, the Euler-Lagrange equation of motion, and the wave equation of the parallel-wire transmission line (201) are given by Eq. (6), Eq. (7), and Eq. (8) below.

$$\pi = \partial_{\dot{q}} \mathcal{L} = -l \dot{q} \qquad \text{Eq. (6)}$$

$$\dot{\pi} = \partial_q \mathcal{L} = -l \ddot{q} = -\frac{q''}{c} + 2 \frac{q}{sC} \qquad \text{Eq. (7)}$$

$$-\ddot{q} = -\frac{q''}{lc} + 2 \frac{q}{lsC} \qquad \text{Eq. (8)}$$

Based on the wave equation Eq. (8), the dispersion relation for the parallel-wire transmission line (201) is given by Eq. (9a), Eq. (9b), and Eq. (9c) below.

$$v \equiv \frac{1}{\sqrt{lc}} \qquad \text{Eq. (9a)}$$

$$\omega_0 = \frac{1}{\sqrt{lsC/2}} \qquad \text{Eq. (9b)}$$

$$\omega^2 = v^2 k^2 + \omega_0^2 \qquad \text{Eq. (9c)}$$

In Eq. (9a), Eq. (9b), and Eq. (9c), $\omega$ represents an angular frequency, k represents a wave number, v represents an asymptotic wave velocity as defined in Eq. (9a), and $\omega_o$ represents a cut off angular frequency as defined in Eq. (9b). In particular, the cut off angular frequency $\omega_o$ is independent of the length, and varies logarithmically with the width, of the parallel-wire transmission line (201). In one or more embodiments, one or more wire segments with associated capacitors of the parallel-wire transmission line (201) are detachable. Accordingly, the parallel-wire transmission line (201) may be re-configured, without substantially changing ω$_o$, by the user to change the total length according to the dimension of the wireless power transfer area (101).

Figure 3A:
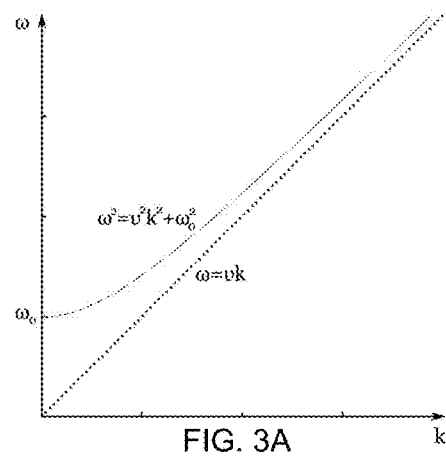
FIGS. 3A, 3B, 3C, 3D, and 3E show example characteristics of an example variable form factor transmitter in accordance with one or more embodiments of the invention.

Based on Eq. (9c), FIG. 3A shows a plot of angular frequency, ω, versus wave number, k, to illustrate the dispersion relation for the parallel-wire trans-mission line (201). In addition, the phase velocity, v$_p$, and group velocity, v$_g$, are given in Eq. (10a) and Eq. (10b) below.

$$v_p = \frac{\omega}{k} \quad \text{Eq. (10a)}$$

$$v_g = \frac{\partial \omega}{\partial k} \quad \text{Eq. (10b)}$$

Note that as the wave number k asymptotically approaches 0, the phase velocity v$_p$ asymptotically approaches infinity, the group velocity v$_g$ asymp-totically approaches 0, and the angular frequency w asymptotically approaches ω$_0$.

Figure 2B:
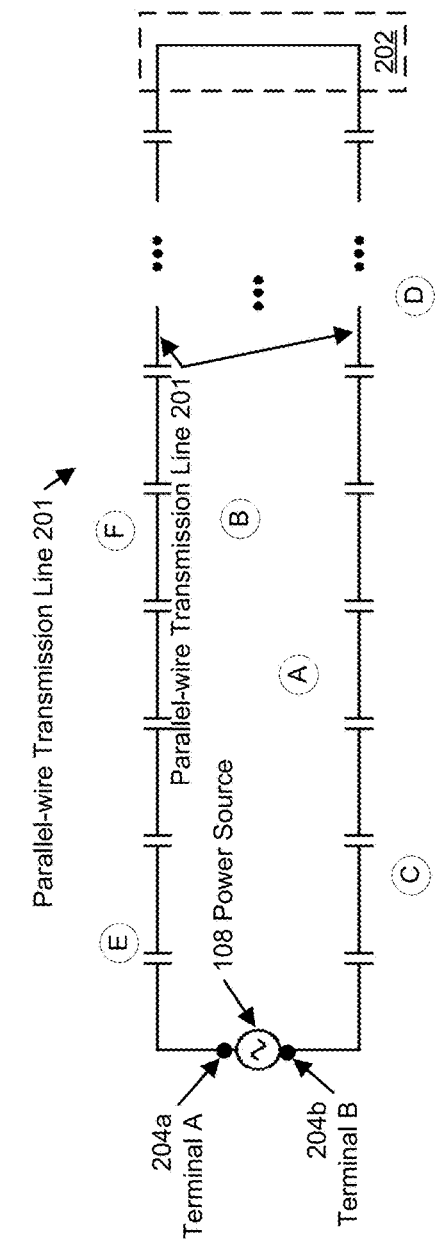

FIG. 2B shows a schematic diagram of the parallel-wire transmission line (201) driven by the RF power source (108) in accordance with one or more embodiments of the invention. In one or more embodiments, one or more of the modules and elements shown in FIG. 2B may be omitted, repeated, and/or substituted. Accordingly, embodiments of the invention should not be considered limited to the specific arrangements of modules shown in FIG. 2B.

As shown in FIG. 2B, the parallel-wire transmission line (201) is driven by the RF power source (108) connected via the terminal A (204a) and terminal B (204b). Further, the parallel-wire transmission line (201) is terminated by an electrically conducting connection (202) and operating at the characteristic frequency ω$_o$. In one or more embodiments of the invention, the electrically conducting connection (202) may be substituted by a variable capacitor or other electronic component, which may be used to fine tune the characteristic frequency of the parallel-wire transmission line (201).

In one or more embodiments of the invention, the configuration of the parallel-wire transmission line (201) shown in FIG. 2B approximates the variable form factor transmitter (102) depicted in FIG. 1A above. Similar to FIG. 1A, receiver devices (e.g., denoted as circular icons labeled as A, B, C, D, E, and F) are disposed about the parallel-wire transmission line (201) shown in FIG. 2B. The approximation is particularly suitable for the scenario where the wireless power transfer area (101) has an elongated shape and where the string of distributed capacitors of the variable form factor transmitter (102) is arranged into a pair of parallel lines according to the elongated shape of the wireless power transfer area (101). As described below, the characteristic frequency of the variable form factor transmitter (102) corresponds to ω$_o$ described in reference to FIG. 2A above and is substantially independent of the length, and varies logarithmically with the width, of the parallel-wire transmission line (201).

In the configuration shown in FIG. 2B, the standing wave along the parallel-wire transmission line (201), as excited by the RF power source (108), has an infinite phase velocity. Therefore, the voltages and currents along the parallel-wire transmission line (201) are all in phase at different positions of the parallel-wire transmission line (201). In other words, the effective electrical length of the parallel-wire transmission line (201) equals zero regardless of the physical length of the parallel-wire transmission line (201). In the scenario where there is no energy loss in the parallel-wire transmission line (201), the input impedance of the parallel-wire transmission line (201) as presented to the RF power source (108) equals zero regardless of the physical length of the parallel-wire transmission line (201). In other words, the parallel-wire transmission line (201) is equivalent to an R$_L$ C circuit (not shown) resonant at ω$_o$, regardless whether the physical length of the parallel-wire transmission line (201) is much shorter or much lunger than the free-space wavelength (e.g., based on the transmission medium of the wireless power transfer area (101)) of the driving frequency, i.e., coo. Accordingly, the parallel-wire transmission line (201) driven by the RF power source (108) and terminated by the electrically conducting connection (202) may be used as a resonant power source for wireless power transfer to induce resonances of receiver devices that are placed in the vicinity of the parallel-wire transmission line (201). In particular, the resonant receiver devices couple to the electric and/or magnetic fields generated by the standing wave of the parallel-wire transmission line (201) and receive power from the electric and/or magnetic fields.

In one or more embodiments, the resonant receiver devices receive power from a near electromagnetic field of the parallel-wire transmission line (201). Even if the physical length of the parallel-wire transmission line (201) is much longer than the free-space wavelength (e.g., based on the transmission medium of the wireless power transfer area (101)) of the driving frequency, the power supplied from the RF power source (108) is substantially retained in the parallel-wire transmission line (201) for transferring to the nearby resonant receiver devices without being lost to far field radiation. The quality factor of the parallel-wire transmission line due to radiation loss depends only on the wire separation and wire radius, not on the length.

FIG. 2C shows a variation of the parallel-wire transmission line (201) with distributed capacitance in which one of the conductor wires forms a conducting shield (203) that surrounds the other conductor wire, hereafter referred to as the shielded transmission line (201a). For example, the conducting shield (203) may be substantially cylindrical. The shielded transmission line (201a) shown in FIG. 2C operates by the same principle as the parallel-wire transmission line (201) shown in FIG. 2B above, except the distributed capacitance is only placed on the center conductor. In some configurations, the center conductor may not be concentric with the outer conductor (i.e., conducting shield 203). Further, the cross sections of the center conductor and outer conductor (i.e., conducting shield 203) may not be circular.

In one or more embodiments of the invention, the configuration of the shielded transmission line (201a) shown in FIG. 2C approximates the variable form factor transmitter (102) depicted in FIG. 1A above. Similar to FIG. 1A, receiver devices (e.g., denoted as circular icons labeled as A, B, C, D, E, and F) are disposed about the parallel-wire transmission line (201) shown in FIG. 2C. The approximation is particularly suitable for the scenario where the wireless power transfer area (101) corresponds to the interior space within a conductive enclosure, such as within a metal pipeline, an airframe of an airplane or space shuttle, etc. The characteristic frequency of the variable form factor transmitter (102), as shown in FIG. 2C, corresponds to ω$_o$ described in reference to FIGS. 2A and 2B above and is substantially independent of the length, and varies logarithmically with the diameter, of the conducting shield (203). The character-istic frequency of the shielded transmission line (201a) shown in FIG. 2C is given by Eq. (11). Note that this differs from Eq. (9b) by a factor of $\sqrt{2}$ due to the fact that only one of the conductor wires includes distributed capacitors.

$$\omega_0 = \frac{1}{\sqrt{lsC}} \qquad \text{Eq. (11)}$$

Figure 3B:
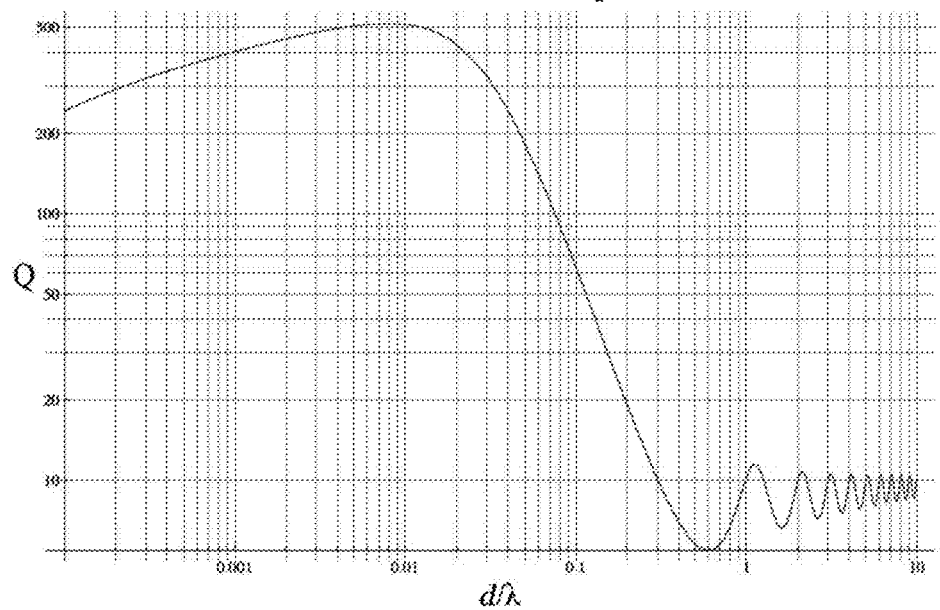

FIG. 3B shows a plot of the quality factor, Q, of a parallel-wire trans-mission line (e.g., shown in FIG. 2A or FIG. 2B) of arbitrary length, consisting of 14 AWG copper wire, driven at 6.78 MHz, as a function of the separation, d, (between the two wires) divided by the free-space wavelength λ. For wire sep-arations large relative to the free-space wavelength, the Q is suppressed due to radiation loss. However, for wire separations small compared to the free-space wavelength, the radiation is suppressed and the loss is dominated by ohmic losses in the copper wire.

Note that the shielded transmission line (201) has no radiative loss due to the fact that the conducting shield (203) completely encloses the internal electromagnetic fields.

Figure 3C:
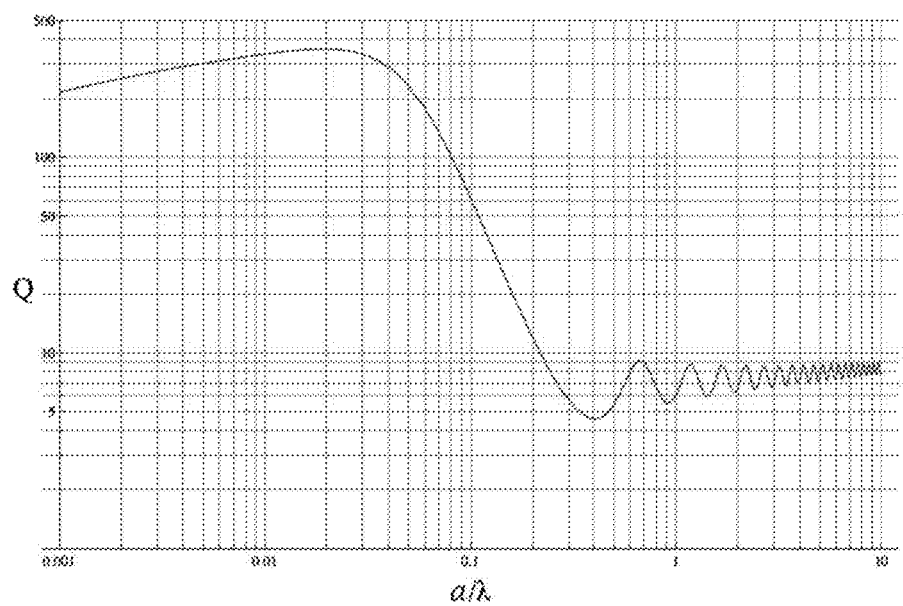

In contrast, while a conducting wire loop driven by the RF power source (108), described in reference to FIG. 2D below, may also transfer power to resonant receiver devices in the vicinity, the efficiency of the power transfer is decreased due to far field radiation as the dimension of the conducting wire loop increases to approach or exceed the free-space wavelength of the driving frequency. FIG. 3C shows a plot of the quality factor, Q, of a circular loop consisting of 14 AWG copper wire, driven at 6.78 MHz, as a function of the loop radius a divided by the free-space wavelength λ. Note that the Q becomes low, and therefore the efficiency of wireless power transfer is suppressed, as the loop radius becomes large relative to the free-space wavelength.

FIG. 2D shows a schematic diagram of a wire loop (204) having distributed capacitors and driven by the RF power source (108) in accordance with one or more embodiments of the invention. In one or more embodiments, one or more of the modules and elements shown in FIG. 2D may be omitted, repeated, and/or substituted. Accordingly, embodiments of the invention should not be considered limited to the specific arrangements of modules shown in FIG. 2D.

In one or more embodiments, the wire loop (204) has a circular loop radius, a, and a wire radius (corresponding to a gauge of the wire), b, (not shown) and is composed of wire segments of length s joined by a number of capacitors, C. In one or more embodiments of the invention, the configuration of the wire loop (204) shown in FIG. 2D approximates the variable form factor transmitter (102) depicted in FIG. 1A above. The approximation is particularly suitable for the scenario where a particular shape of the wireless power transfer area (101) matches the circular form factor of the variable form factor transmitter (102). As is described below, the characteristic frequency of the variable form factor transmitter (102) corresponds to a resonant frequency $\omega_o$ of the wire loop (204) and is substantially independent of the width and/or length (i.e., form factor) of the wire loop (204).

The inductance, L, the total capacitance, $C_{tot}$, and the resonant angular frequency, $\omega_o$, of the wire loop (204) are given by Eq. (12a), Eq. (12b), and Eq. (12c) below.

$$L = \mu a \left[ \ln\left(\frac{8a}{b}\right) - 2 \right] \qquad \text{Eq. (12a)}$$

$$C_{tot} = \frac{C}{N} = \frac{C}{(2\pi a / s)} \qquad \text{Eq. (12b)}$$

$$\omega_0^2 = \frac{1}{LC_{tot}} \qquad \text{Eq. (12c)}$$
$$= \frac{1}{\mu a \left[ \ln\left(\frac{8a}{b}\right) - 2 \right] \cdot \frac{s}{2\pi a} \cdot C}$$
$$= \frac{1}{\frac{\mu}{2\pi} sC \left[ \ln\left(\frac{8a}{b}\right) - 2 \right]}$$

In Eq. (12a), Eq. (12b), and Eq. (12c), N denotes the number of wire segments or capacitors, C, in the wire loop (204) and μ denotes the electro-magnetic permeability of the transmission medium in the wireless power transfer area (101). In one or more embodiments, the resonant angular frequency, $w_o$, depends only weakly on the radius, a, of the wire loop (204) or the wire radius, b. In one or more embodiments, one or more wire segments with associated capacitors of the wire loop (204) are detachable. Accordingly, the wire loop (204) may be reconfigured, without substantially changing the resonant angular frequency $\omega_o$, by the user to change the loop radius, a, according to the dimen-sions of the wireless power transfer area (101).

Unlike the parallel-wire transmission line (201) shown in FIG. 2A above, the wire loop (204) becomes an efficient far field radiator as the radius, a, becomes comparable to or exceeds the free-space wavelength (e.g., based on the transmission medium of the wireless power transfer area (101)) of the driving frequency, i.e., $\omega_o$. The radiation resistance (i.e., effective series resistance due to far field radiation) $R_{rad}$ of a closed loop of wire carrying a uniform current is given by the double integral over the wire path shown Eq. (13a) below.

$$R_{rad} = \frac{\zeta \kappa^2}{4\pi} \int dr_1 \cdot dr_2 \frac{\sin(k|r_1 - r_2|)}{\kappa |r_1 - r_2|} \qquad \text{Eq. (13a)}$$

$$\varsigma = \sqrt{\frac{\mu}{\epsilon}} \qquad \text{Eq. (13b)}$$

$$\kappa \equiv \frac{\omega}{c} = \frac{2\pi}{\lambda} \qquad \text{Eq. (13c)}$$

Figure 3D:
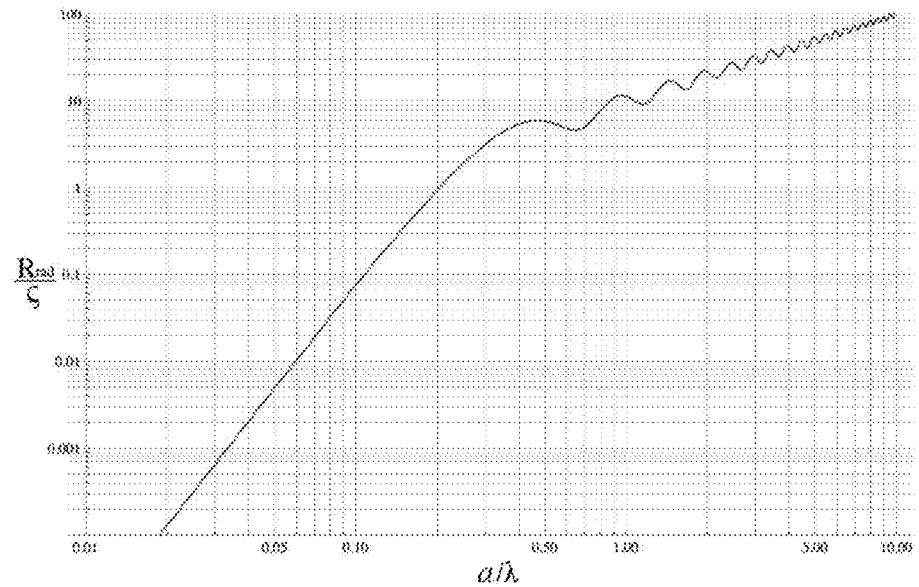

In Eq. (13a), based on the transmission medium of the wireless power transfer area (101), c is the impedance of free space, and κ is the free-space wavenumber. Based on Eq. (13a) applied to the wire loop (204), FIG. 3D shows a plot of radiation resistance divided by the impedance of free space as a function of radius divided by wavelength. As can be seen from FIG. 3D, the radiation resistance has the asymptotic forms for large and small loop radius given in Eq. (14) below.

$$\frac{R_{rad}}{\zeta} \approx \frac{8\pi^5}{3}\left(\frac{a}{\lambda}\right)^4, a \ll \lambda \qquad \text{Eq. (14)}$$

$$\frac{R_{rad}}{\zeta} \approx \pi^2 \left(\frac{a}{\lambda}\right)^4, a \gg \lambda$$

The quality factor, Q, of the loop due to radiation is equal to the ratio of the inductive reactance, $\omega_o L$, divided by the total series resistance, R, which includes the radiation resistance, $R_{rad}$. As the radiation resistance increases, the quality factor decreases, causing the efficiency of the wireless power transfer to decrease.

For the circular wire loop (204) shown in FIG. 2D, Eq. (12c) applies where $\omega_0=\sqrt{2\pi/(\mu sC(\ln(8a/b)-2))}$ with a being the loop radius and b being the wire radius. For the parallel-wire transmission line (201) shown in FIG. 2B, Eq. (9b) applies and it can be shown that $\omega_0=\sqrt{2\pi/(\mu sC\ln(d/b))}$, with d being the width of the parallel-wire transmission line and b being the wire radius. The characteristic frequencies, $\omega_0$, have similar values for both circular loop and parallel-wire configurations if $h(a/b) \approx h(d/b)$. In this manner, a single variable form factor transmitter (102) may be manufactured for use in both elongated-shaped service area and circular-shaped service area based on the user adapted elongated form factor or circular form factor. In other words, based on the wire diameter, b, used to manufacture the variable form factor transmitter (102), the user may select the loop radius, a, and the parallel-wire transmission line width, d, such that $h(a/b) \approx h(d/b)$. In this manner, one single variable form factor transmitter manufactured in the factory can be configured into either a parallel-wire form factor depicted in FIG. 2B or a circular form factor depicted in FIG. 2D to supply power to the same set of receiving devices that are tuned to the particular resonant frequency, $\omega_0$.

Figure 2E:
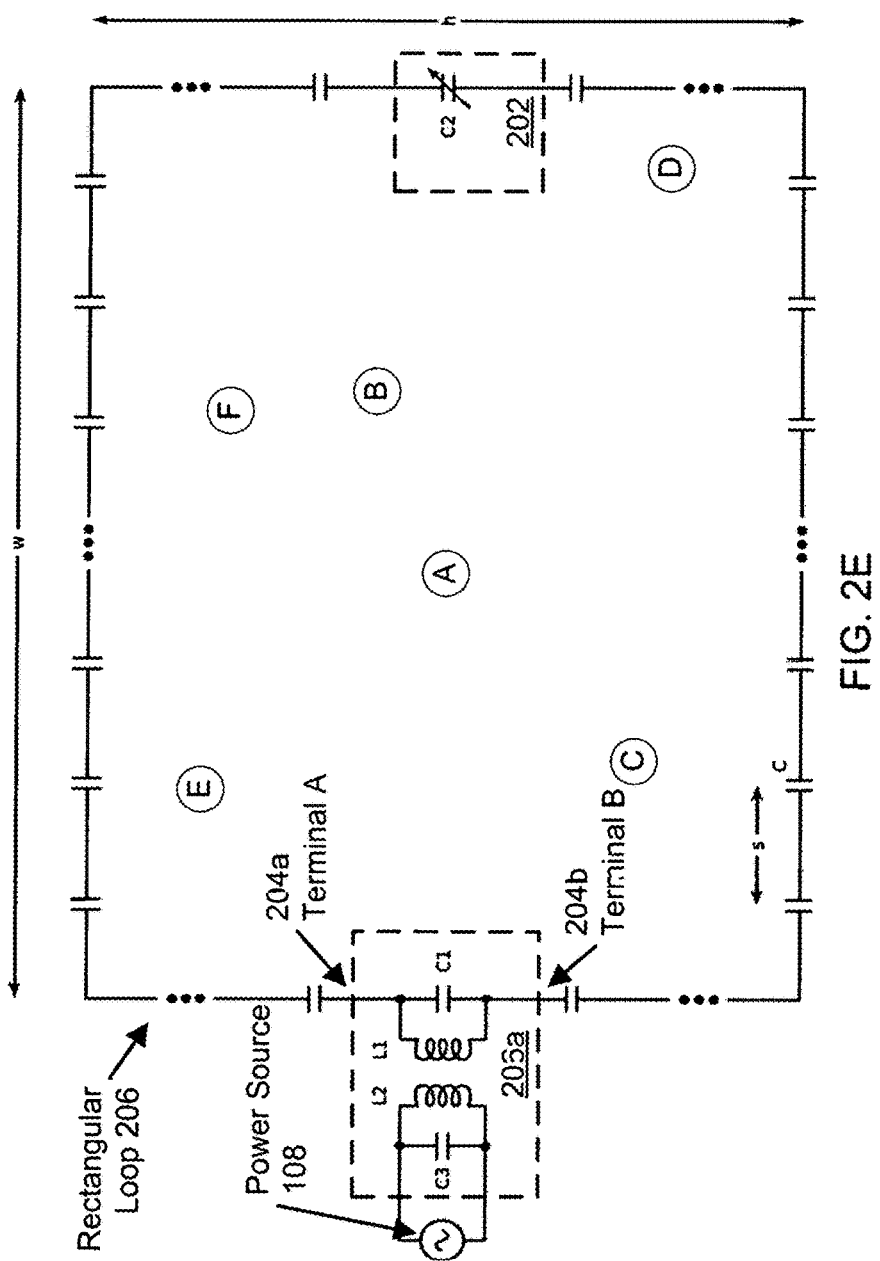

FIG. 2E shows a schematic diagram of a rectangular loop (206) having distributed capacitors and driven by the RF power source (108) in accordance with one or more embodiments of the invention. In one or more embodiments of the invention, the configuration of the rectangular loop (206) approximates the variable form factor transmitter (102) depicted in FIG. 1A above. Similar to FIG. 1A, receiver devices (e.g., denoted as circular icons labeled as A, B, C, D, E, and F) are disposed about the rectangular loop (206) shown in FIG. 2E. For example, the rectangular loop (206) may correspond to the parallel-wire transmission line (201) shown in FIG. 2B that has been adapted by a user to fit a rectangular-shaped wireless power transfer area. In another example, the rectangular loop (206) may correspond to the wire loop (204) shown in FIG. 2D that has been adapted by a user to fit a rectangular-shaped wireless power transfer area. As shown in FIG. 2E, the rectangular loop (206) is driven by the RF power source (108) using a transformer coupling scheme. In particular, the transformer (206a) includes a capacitor $C_1$ in parallel to the primary coil $L_1$ and a capacitor $C_3$ in parallel to the secondary coil $L_2$. In addition, the electrically conducting connection (202) shown in FIG. 2B is substituted by a capacitor $C_2$. The capacitance values of the capacitors $C_1$, $C_2$, and $C_3$ may be adjusted in the factory and/or by the user for impedance matching between the power source (108) and the rectangular loop (206) and for tuning the resonant frequency of the rectangular loop (206).

Figure 2F:
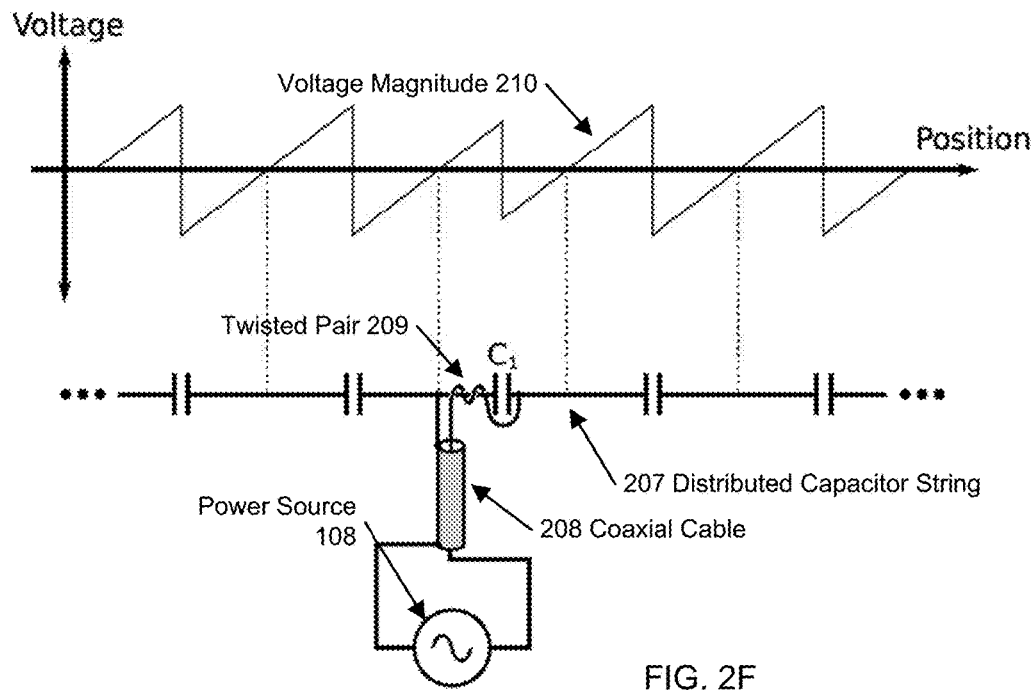

FIG. 2F shows a schematic diagram of connecting the power source (108) using a capacitive coupling scheme. In particular, the power source (108) is connected to a distributed capacitor string (207), via a coaxial cable (208) and a twisted pair (209), at opposite terminals of a tuning capacitor $C_1$. The value of the tuning capacitor $C_1$ may be adjusted in the factory or by the user to provide a proper impedance match to both the RF power source (108) and the coaxial cable (208). By attaching the shield of the coaxial cable (208) to a voltage node of the distributed-capacitor string (207), the shield of the coaxial cable (208) is maintained at ground potential.

In one or more embodiments, the distributed capacitor string (207) may correspond to a portion of the parallel-wire transmission line (201) shown in FIGS. 2B and 2C, a portion of the wire loop (204) shown in FIG. 2D, or a portion of the rectangular loop (206) shown in FIG. 2E. The voltage magnitude relative to ground (210) induced by the power source (108), is shown as a function of the position along the distributed capacitor string (207).

Figure 2G:
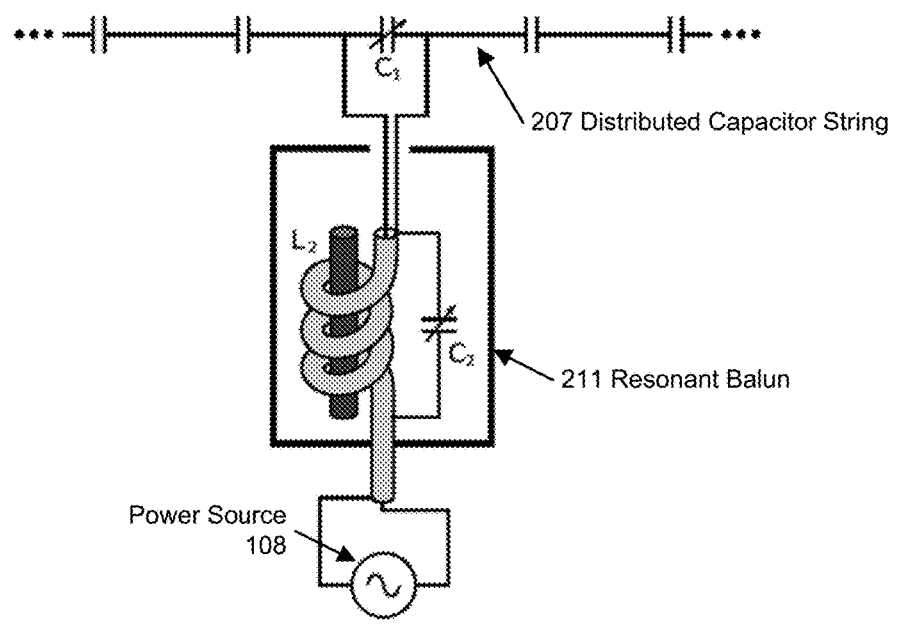

FIG. 2G shows a schematic diagram for connecting the power source (108) to the variable form factor transmitter using an alternative capacitive coupling scheme. As shown in FIG. 2G, a resonant balun (211) is used to connect the power source (108) to the tuning capacitor, $C_1$.

Figure 3E:
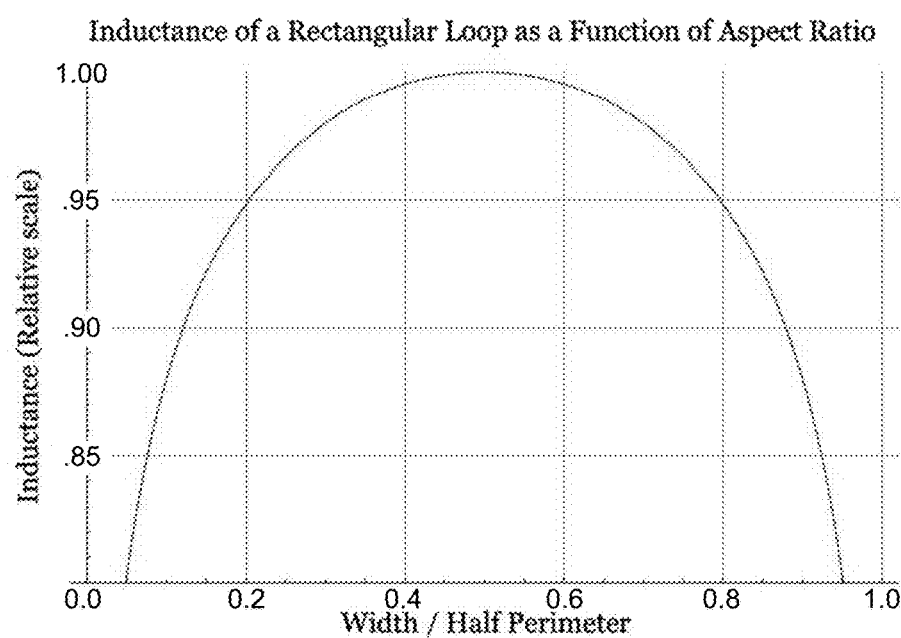

FIG. 3E is a plot of inductance as a function of the aspect ratio (represented by width/half-perimeter) of a rectangular loop (e.g., rectangular loop (206) depicted in FIG. 2E above), made from 83 feet of 14 AWG wire, and driven at 6.78 MHz. The rectangular loop with the range of aspect ratios shown in FIG. 3E represents various shapes the wire loop (204) shown in FIG. 2D may be adapted by the user to fit any wireless power transfer area. The plot shows the inductance of the rectangular loop as the perimeter (i.e., corresponding to the circumference of the wire loop (204)) is held fixed but the aspect ratio is varied. As can be seen from the plot, the inductance varies less than 20% as the aspect ratio is varied over a wide range between 0.05 and 0.95. Accordingly, the characteristic frequency of the wire loop (204) varies less than 10% while being adapted into a rectangular loop over a wide range of aspect ratios. This demonstrates the relative insensitivity of the resonant frequency of the loop with distributed capacitance to variations in the adapted form factor.

Referring back to the discussion of FIG. 1A, in one or more embodiments of the invention, the system (100) provides wireless power transfer across the wireless power transfer area (101) based on the ISM band. In the scenario where the variable form factor transmitter (102) is approximated by the parallel-wire transmission line (201) shown in FIG. 2A, 2B, or 2C, the values of the wire segment length s, the inductance per unit length l, and the capacitor C may be chosen in the factory, based on Eq. (9b), to maintain the resonant angular frequency $\omega_o$ of the parallel-wire transmission line (201) equal to the angular frequency of the RF power source, which may be within the type A frequency range (i.e., 6.765 MHz-6.795 MHz) defined in the ITU Radio Regulations Article 5, footnote 5.138.

In the scenario where the variable form factor transmitter (102) is approx-imated by the wire loop (204) shown in FIG. 2D, the values of the wire segment length, s, and the capacitor, C, may be chosen in the factory, based on Eq. (12c), to maintain the resonant angular frequency $\omega_o$ of the wire loop (204) equal to the angular frequency of the RF power source, which may be within the type A frequency range (i.e., 6.765 MHz-6.795 MHz) defined in the ITU Radio Regulations Article 5, footnote 5.138.

In one or more embodiments of the invention, the aforementioned manufacturing tolerance is controlled such that the resulting capacitance range, length range, and inductance range do not cause the resonant angular frequency $\omega_o$ to deviate from the type A frequency range (i.e., 6.765 MHz-6.795 MHz). In addition for both scenarios described above, approximation error exists due to physical difference between the user adapted form factor of the variable form factor transmitter (102) and the simplified form factor of the parallel-wire transmission line (201) or the wire loop (204). In one or more embodiments of the invention, to compensate for the aforementioned manufacturing tolerance and the approximation error, the input impedance and the characteristic frequency of the variable form factor transmitter (102) may be adjustable in the factory as well as by the user.

Further to the discussion of FIG. 1A above, FIG. 2H shows schematic diagrams of an equivalent circuit A (205*a*) and an equivalent circuit B (205*b*) of the variable form factor transmitter (102). For optimal power transfer from the power source (108), the input impedance of the variable form factor transmitter (102) is matched to the output impedance (represented by the resistor $R_L$) of the power source (108). The resistor R is an effective series resistance representing all sources of loss (e.g., ohmic loss, radiation loss, dielectric loss, etc.) of the variable form factor transmitter (102). The variable capacitor $C_1$ determines the apparent input impedance of the variable form factor transmitter (102) at its resonant frequency, while the variable capacitor $C_2$ sets the resonant frequency.

The equivalent circuit B (205*b*) corresponds to a simplified form of the equivalent circuit A (205*a*) where $C_2$, $C_3$, and L have been combined into a single reactance, $\chi$. The input impedance of the variable form factor transmitter (102) is equal to $R_L$ when $C_1$ has the value given by Eq. (15).

$$C_1 = \frac{1}{\omega_0 R_L} \sqrt{\frac{R_L}{R} - 1} \qquad \text{Eq. (15)}$$

For the case where $R_L < R$, the transformer coupling scheme shown in FIG. 2E may be used. For the case where $R_L \geq R$, the capacitive coupling scheme shown in FIG. 2F may be used.

Figure 2J:
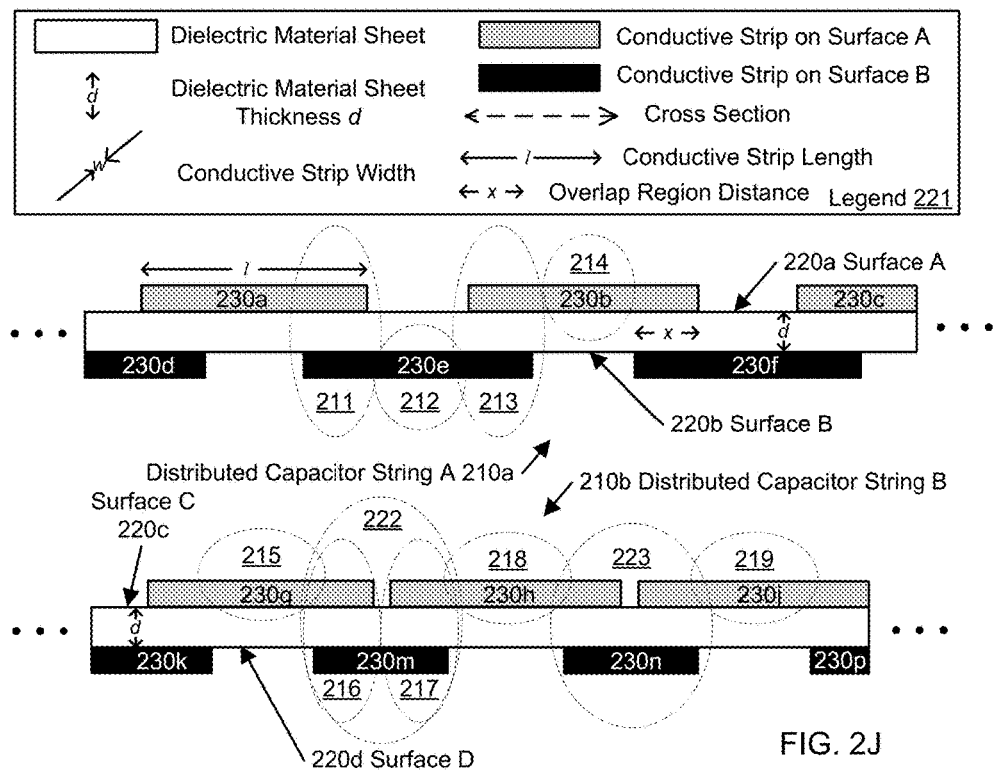

FIG. 2J shows example constructions of the variable form factor transmitter (102), depicted based on the legend (221), in accordance with one or more embodiments. In one or more embodiments, one or more of the modules and elements shown in FIG. 2J may be omitted, repeated, and/or substituted. Accordingly, embodiments of the invention should not be considered limited to the specific arrangements of modules shown in FIG. 2J.

As shown in FIG. 2J, the distributed capacitor string A (210*a*) and distributed capacitor string B (210*b*) are two example constructions of the variable form factor transmitter (102) depicted in FIGS. 1A and 1B above. Accordingly, the wire loop (204) and the rectangular loop (206), respectively depicted in FIGS. 2D and 2E above, may be based on the distributed capacitor string A (210*a*), the distributed capacitor string B (210*b*), or a combination thereof. In particular, the distributed capacitor string A (210*a*) and distributed capacitor string B (210*b*) show two example constructions corresponding to a cross-sectional view of the wire loop (204) or the rectangular loop (206). Specifically, the cross-sectional view includes a cross-section of consecutive capacitors and wire-segments in the wire loop (204) or the rectangular loop (206).

The distributed capacitor string A (210*a*) includes capacitors constructed from conductive strips (230*a*), (230*b*), (230*c*), (230*d*), (230*e*), (230*f*), etc. attached to two opposing surfaces (i.e., surface A (220*a*), surface B (220*b*)) of a dielectric material sheet. Specifically, a sheet has a three-dimensional (3D) form factor with the majority (e.g., greater than 90%) of surface area occupied by the two opposing surfaces. In other words, the thickness (i.e., distance between the two opposing surfaces) of the sheet is substantially less than each dimension of the two opposing surfaces. In this context, the 3D form factor of the sheet may be represented as a two-dimensional (2D) form factor with the thickness along a third dimension perpendicular to a surface (e.g., surface A (220*a*), surface B (220*b*)) of the 2D form factor. A conductive strip is a sheet of conductive material that is attached to, and has a substantially smaller (e.g., less than 10%) area than, the dielectric material sheet. The distributed capacitor string A (210*a*) is depicted in a cross-sectional view showing cross-sections of the conductive strips and the dielectric material sheet. In particular, the cross-sectional view cuts across the surface A (220*a*) and surface B (220*b*) along the third dimension to show the thicknesses of the conductive strips and the dielectric material sheet.

In one or more embodiments, one or more of the conductive strips (230*a*), (230*b*), (230*c*), (230*d*), (230*e*), (230*f*), etc. are printed on the surface A (220*a*) and/or surface B (220*b*) using conductive ink, paste, paint, or other conductive coating material. In one or more embodiments, one or more of the conductive strips (230*a*), (230*b*), (230*c*), (230*d*), (230*e*), (230*f*), etc. are formed by selectively etching one or more conductive films laminated with the dielectric material sheet. For example, the conductive film(s) and the dielectric material sheet may be laminated together by heat, pressure, adhesive, welding, or other suitable method.

For example, the capacitor (211) includes overlapping portions of the conductive strip (230*a*) and conductive strip (230*e*), respectively attached to the surface A (220*a*) and surface B (220*b*), that are separated by a thickness d of the dielectric material sheet. The overlapping portions of the conductive strip (230*a*) and conductive strip (230*e*) form two electrodes in a parallel-plate configuration of the capacitor (211). Similarly, the capacitor (213) includes overlapping portions of the conductive strip (230*b*) and conductive strip (230*e*), respectively attached to the surface A (220*a*) and surface B (220*b*), that are separated by the thickness d of the dielectric material sheet. The overlapping portions of the conductive strip (230*b*) and conductive strip (230*e*) form two electrodes in the parallel-plate configuration of the capacitor (213). The overlapping portions of two adjacent conductive strips are referred to as the overlap region having a distance x. Further, each of the conductive strips (230*a*), (230*b*), (230*c*), (230*d*), (230*e*), (230*f*), etc. acts as an inductive segment that connects two adjacent capacitors in the distributed capacitor string A (210*a*). For example, the conductive strip (230*e*) acts as, or otherwise implements, the inductive segment (212) to connect the capacitor (211) and capacitor (213) in series. Accordingly, the capacitor (211) and the inductive segment (212) form one of the multiple capacitor-wire segments of the distributed capacitor string A (210*a*). Similarly, the capacitor (213) and the inductive segment (214) form another one of the multiple capacitor-wire segments of the distributed capacitor string A (210*a*). In the distributed capacitor string A (210*a*), the surface of the dielectric material sheet, where the inductive segments are attached, alternates between the surface A (210*a*) and surface B (210*b*). For example, the inductive segment (212) and one electrode of the capacitor (213) are integrated as a single conductive strip (230*e*) attached to the surface A (210*a*), while the inductive segment (214) and the other electrode of the capacitor (213) are integrated as a single conductive strip (230*b*) attached to the opposing surface B (210*b*). In this context, each capacitor-wire segment shown in the distributed capacitor string A (210*a*) is a first type of integrated capacitor-wire segment. As used herein, the integrated capacitor-wire segment is a capacitor and an inductive segment that are connected in series where the inductive segment and one electrode of the capacitor are integrated into a single conductive strip.

Further as shown in FIG. 2J, the distributed capacitor string B (210b) includes capacitors constructed from conductive strips (230g), (230h), (230j), (230k), (230m), (230n), (230p), etc. attached to two opposing surfaces (i.e., surface C (220c), surface D (220d)) of a dielectric material sheet. Similar to the distributed capacitor string A (210a), the distributed capacitor string B (210b) may be constructed by printing, lamination, etching, or combinations thereof. For example, the capacitor (216) includes overlapping portions of the conductive strip (230g) and conductive strip (230m), respectively attached to the surface C (220c) and surface D (220d), that are separated by the thickness d of the dielectric material sheet. The overlapping portions of the conductive strip (230g) and conductive strip (230m) form two electrodes in the parallel-plate configuration of the capacitor (216). The capacitor (217) includes overlapping portions of the conductive strip (230h) and conductive strip (230m), respectively attached to the surface C (220c) and surface D (220d), that are separated by the thickness d of the dielectric material sheet. The overlapping portions of the conductive strip (230h) and conductive strip (230m) form two electrodes in the parallel-plate configuration of the capacitor (217). The capacitor (217) and capacitor (216) are connected together in series at the conductive strip (230m) to form a combined capacitor (222) that is itself connected between the conductive strip (230g) and conductive strip (230h). Similarly, the combined capacitor (223), including two capacitors connected in series, is connected between the conductive strip (230h) and conductive strip (230j). Further, each of the conductive strips (230g), (230h), (230j), etc. acts as an inductive segment that connects two adjacent combined capacitors in the distributed capacitor string B (210b). For example, the conductive strip (230h) acts as, or otherwise implements, the inductive segment (218) to connect the combined capacitor (222) and combined capacitor (223) in series. Accordingly, the combined capacitor (222) and the inductive segment (218) form one of the multiple capacitor-wire segments of the distributed capacitor string B (210b). Similarly, the combined capacitor (223) and the inductive segment (219) form another one of the multiple capacitor-wire segments of the distributed capacitor string B (210b). In the distributed capacitor string B (210b), the inductive segments (215), (218), (219), etc. are attached to a single surface (i.e., surface C (220c)) of the dielectric material sheet. For example, the inductive segment (218) and one electrode of the combined capacitor (223) are integrated as a single conductive strip (230h) attached to the surface C (210c), while the inductive segment (219) and the other electrode of the combined capacitor (223) are integrated as a single conductive strip (230j) attached to the same surface C (210c). In this context, each capacitor-wire segment shown in the distributed capacitor string B (210B) is a second type of integrated capacitor-wire segment.

As noted above, the wire loop (204) and the rectangular loop (206), respectively depicted in FIGS. 2D and 2E above, may be based on the distributed capacitor string A (210a), the distributed capacitor string B (210b), or a combination thereof. In other words, the first type of integrated capacitor-wire segment(s) in the distributed capacitor string A (210a) and/or the second type of integrated capacitor-wire segment(s) in the distributed capacitor string B (210b) may be included in the wire loop (204) and/or the rectangular loop (206), respectively depicted in FIGS. 2D and 2E above. Although a specific number of integrated capacitor-wire segments are shown in the distributed capacitor string A (210a) and the distributed capacitor string B (210b) above, the wire loop (204) and/or the rectangular loop (206) may also include more number of integrated capacitor-wire segments of either type, or less number of integrated capacitor-wire segments of either type, than what is shown in the distributed capacitor string A (210a) and the distributed capacitor string B (210b). In one or more embodiments, either type or both types of integrated capacitor-wire segments may be combined with other forms of capacitor-wire segments (e.g., based on discrete capacitor(s) and inductor(s)) to form the wire loop (204) and/or the rectangular loop (206), respectively depicted in FIGS. 2D and 2E above.

Figure 2K:
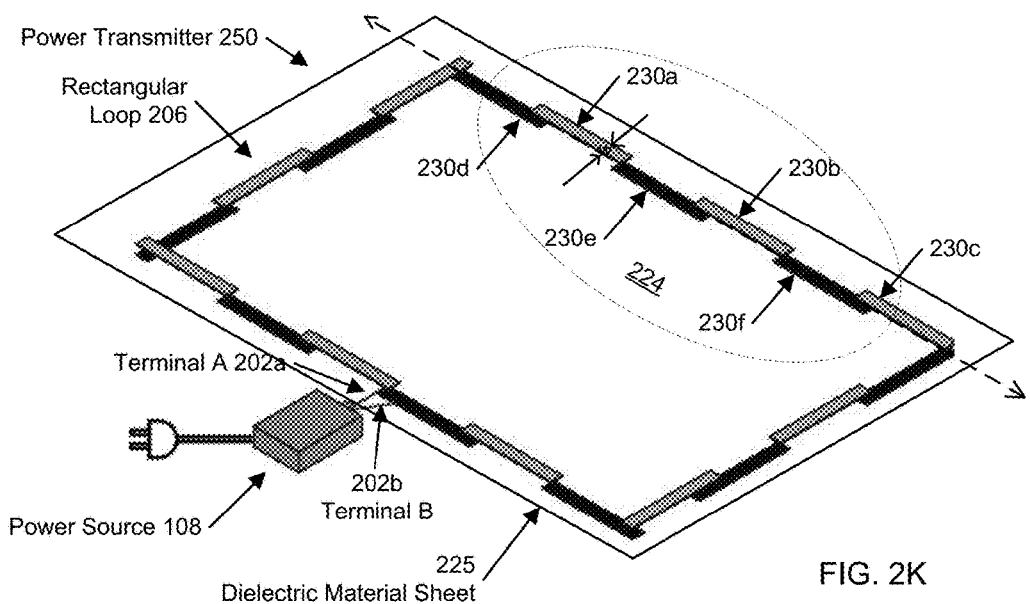

FIG. 2K shows an example construction of the variable form factor transmitter (102), depicted based on the legend (221), in accordance with one or more embodiments. In one or more embodiments, one or more of the modules and elements shown in FIG. 2K may be omitted, repeated, and/or substituted. Accordingly, embodiments of the invention should not be considered limited to the specific arrangements of modules shown in FIG. 2K.

As shown in FIG. 2K, the power transmitter (250), depicted based on the legend (221), shows an example construction corresponding to a three-dimensional (3D) view of FIG. 2E above. The rectangular loop (206) of the power transmitter (250) is based on the distributed capacitor string A (210a) described in reference to FIG. 2J above. Specifically, a portion (224) of the rectangular loop (206) corresponds to a 3D view of the distributed capacitor string A (210a) depicted in FIG. 2J. In other words, the distributed capacitor string A (210a) depicted in FIG. 2J corresponds to a cross section (designated by the double arrowed and dashed line) of the portion (224). The thicknesses of the conductive strips and the dielectric material sheet in the distributed capacitor string A (210a) are omitted in the 3D view for clarity of showing the aforementioned 2D form factors.

RF characteristics of the rectangular loop (206) is described below, where the width, length, and number of overlap regions of the rectangular loop (206) are denoted as a, b, and n, respectively. The overlap area A between two adjacent conductive strips may be computed using Eq. (16), where the conductive strip width, conductive strip length, and overlapping region distance are denoted as w, l, and x, respectively.

$$A = w \times x \qquad \text{Eq. (16)}$$

The capacitance of each overlap region may be computed using Eq. (17), where the dielectric constant and the thickness of the dielectric material sheet, are denoted as ε and d, respectively.

$$C = \frac{\varepsilon A}{d} \qquad \text{Eq. (17)}$$

The total capacitance of the rectangular loop (206) may be computed using Eq. (18).

$$C_{tot} = \frac{C}{n} \qquad \text{Eq. (18)}$$

The total inductance of the rectangular loop (206) may be computed using Eq. (19) and Eq. (20).

$$L = \frac{\mu}{\pi}\left[a\ln\frac{2a}{\rho} + b\ln\frac{2b}{\rho} + 2\sqrt{a^2+b^2} - a\sinh^{-1}\frac{a}{b} - b\sinh^{-1}\frac{b}{a} - 2(a+b))\right] \qquad \text{Eq. (19)}$$

-continued $$\rho = \frac{w}{4} \quad \text{Eq. (20)}$$

The resonant frequency $\omega_o$ of the rectangular loop (206) may be computed using Eq. (21).

$$\omega_o = \frac{1}{\sqrt{LC_{tot}}} \quad \text{Eq. (21)}$$

Additional relationships between the resonant frequency and other parameters of the rectangular loop (206) include Eq. (22), Eq. (23), and E1. (24).

$$C_{tot} = \frac{1}{L\omega_o^2} \quad \text{Eq. (22)}$$

$$\frac{\varepsilon A}{d} = \frac{n}{L\omega_o^2} \quad \text{Eq. (23)}$$

$$\frac{A}{d} = \frac{n}{\varepsilon L\omega_o^2} \quad \text{Eq. (24)}$$

TABLE 2 lists four examples of the RF characteristics of the rectangular loop (206) based on the equations above.

TABLE 2

| d (nm) | A (mm²) | n | ε (F/m) | L (H) | $\omega_o^2$ (Hz²) |
|---|---|---|---|---|---|
| 894.5 | 63.5 | 20 | 8.854E−12 | 1.753E−6 | 1.8148E15 |
| 100.3 | 6.35 | 20 | 8.854E−12 | 1.753E−6 | 1.8148E15 |
| 767.3 | 63.5 | 10 | 8.854E−12 | 1.753E−6 | 1.8148E15 |
| 8.945 | 63.5 | 20 | 8.854E−12 | 1.753E−6 | 1.8148E13 |

In one or more embodiments, the power transmitter (250) is configured based on a pre-determined wireless power transfer area. For example, the pre-determined wireless power transfer area may be a table top surface where one or more mobile receiver devices (e.g., mobile phone) are placed to receive wireless power transfer. The rectangular loop (206) may be movably or permanently disposed along a path based on the table top surface. For example, the path may be the edges of the table top surface, on top of or beneath the table top surface, on a fixture or ceiling above the table top surface, on or embedded in the floor below the table top surface, etc. The power source (108) is connected to the capacitor-wire segments via the terminal A (202a) and terminal B (202b), and may be plugged into a power outlet on a wall near the table top surface. The dielectric material sheet (225) encompasses at least a portion of the path to implement the capacitor(s) of the rectangular loop (206) and to provide mechanical support for the rectangular loop (206).

In another example, the pre-determined wireless power transfer area may be a space adjacent to a window where one or more receiver devices (e.g., mobile phone) are disposed about the space to receive wireless power transfer. The rectangular loop (206) may be movably or permanently disposed along a path based on the window. For example, the path may be the edges of the window frame, in front of or behind the window glass surface, embedded in the window glass or the window frame, etc. The power source (108) may be plugged into a power outlet on a wall where the window is mounted, or wired to the power outlet behind the surface of the wall.

In one or more embodiments, one or more of the dielectric material sheet, conductive strips, and/or integrated capacitor-wire segments may be rigid or pliable, transparent, translucent, or opaque depending on respective thicknesses and/or compositions. Although 2D form factors of the dielectric material sheet, conductive strips, and/or integrated capacitor-wire segments are shown as rectangular shapes in FIG. 2K, different 2D form factors (e.g., polygonal, circular, oval, elliptical, spiral, etc. shapes or combinations thereof) than what is shown may also be exhibited by the dielectric material sheet, conductive strips, and/or integrated capacitor-wire segments. Although the conductive strips in the rectangular loop (206) follows a path outlining a rectangular shape in FIG. 2K, the conductive strips in the rectangular loop (206) may also follow a different path outlining a different shape that turns the rectangular loop (206) into a loop with a different shape, such as a polygonal, circular, oval, elliptical, spiral, etc. loop or combinations thereof. Although a specific number of conductive strips and/or integrated capacitor-wire segments in the rectangular loop (206) are shown in FIG. 2K, the power transmitter (250) may also include more number of integrated capacitor-wire segments, or less number of integrated capacitor-wire segments than what is shown.

Figure 2L:
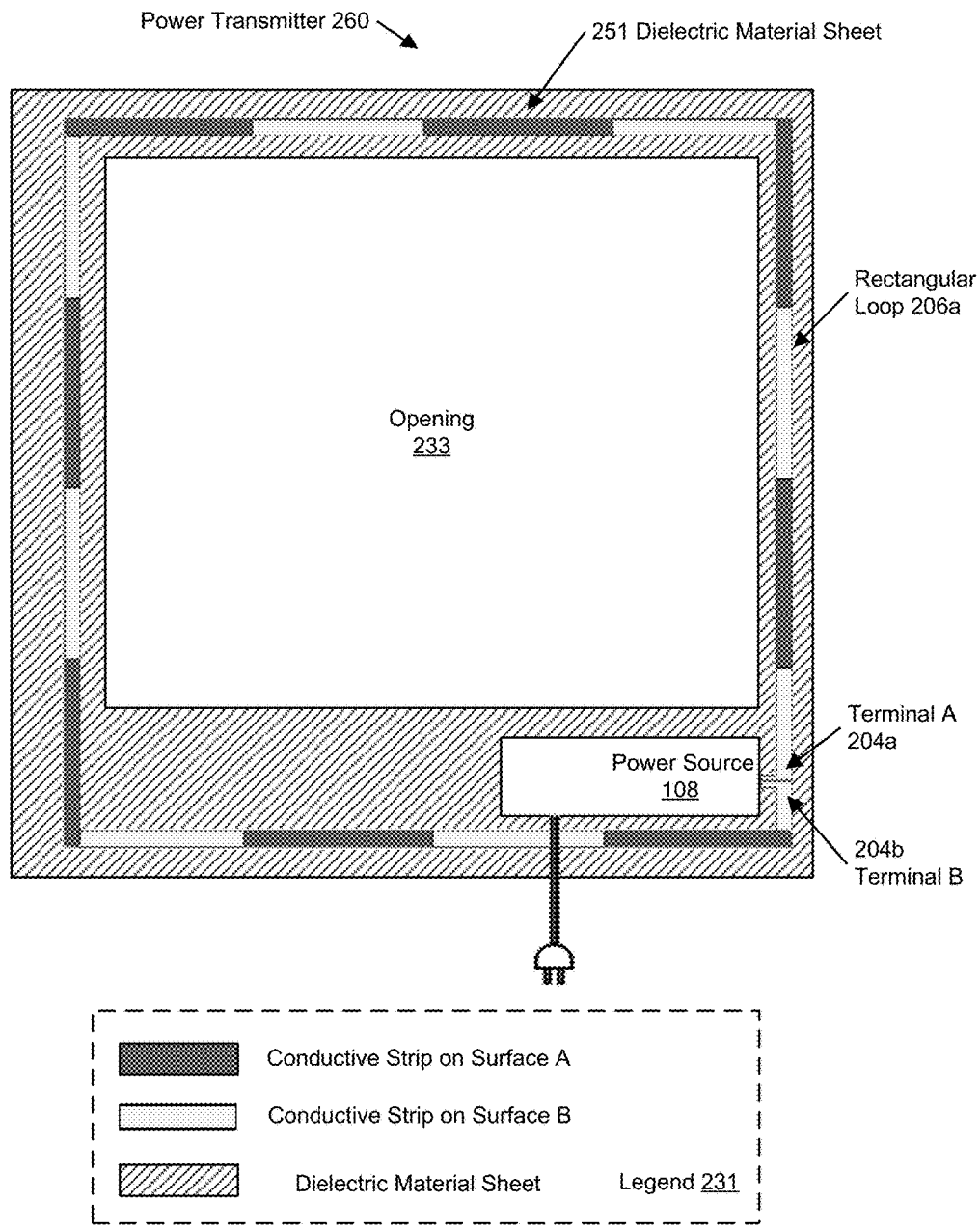

FIG. 2L shows an example construction of the variable form factor transmitter (102) in accordance with one or more embodiments. In one or more embodiments, one or more of the modules and elements shown in FIG. 2L may be omitted, repeated, and/or substituted. Accordingly, embodiments of the invention should not be considered limited to the specific arrangements of modules shown in FIG. 2L.

As shown in FIG. 2L, the power transmitter (260), depicted based on the legend (231), shows an example construction corresponding to a top view of the power transmitter (250) depicted in FIG. 2K above. In particular, the top view has a viewing direction along the aforementioned third dimension perpendicular to the surface (e.g., surface A (220a), surface B (220b)) of the power transmitter (250). The power transmitter (260) includes a rectangular loop (206a) implemented using the dielectric material sheet (251) and connected to the power source (108). The rectangular loop (206a) and dielectric material sheet (251) are variations of the rectangular loop (206) and dielectric material sheet (225) depicted in FIG. 2K above. For, example, the rectangular loop (206a) and the rectangular loop (206) have different number of capacitor-wire segments. Further, the dielectric material sheet (251) includes an opening (233) where the dielectric material is cut out from the dielectric material sheet (251).

In one or more embodiments, the power source (108) is implemented using at least a flexible circuit having a thin insulating polymer film with conductive circuit patterns and electronic chips affixed thereto. For example, the flexible circuit may be attached to and/or mechanically supported by the dielectric material sheet (251). Example details of a portion of the power transmitter (260) containing the power source (108) is shown in FIG. 2M below based on the legend (241).

Figure 2M:
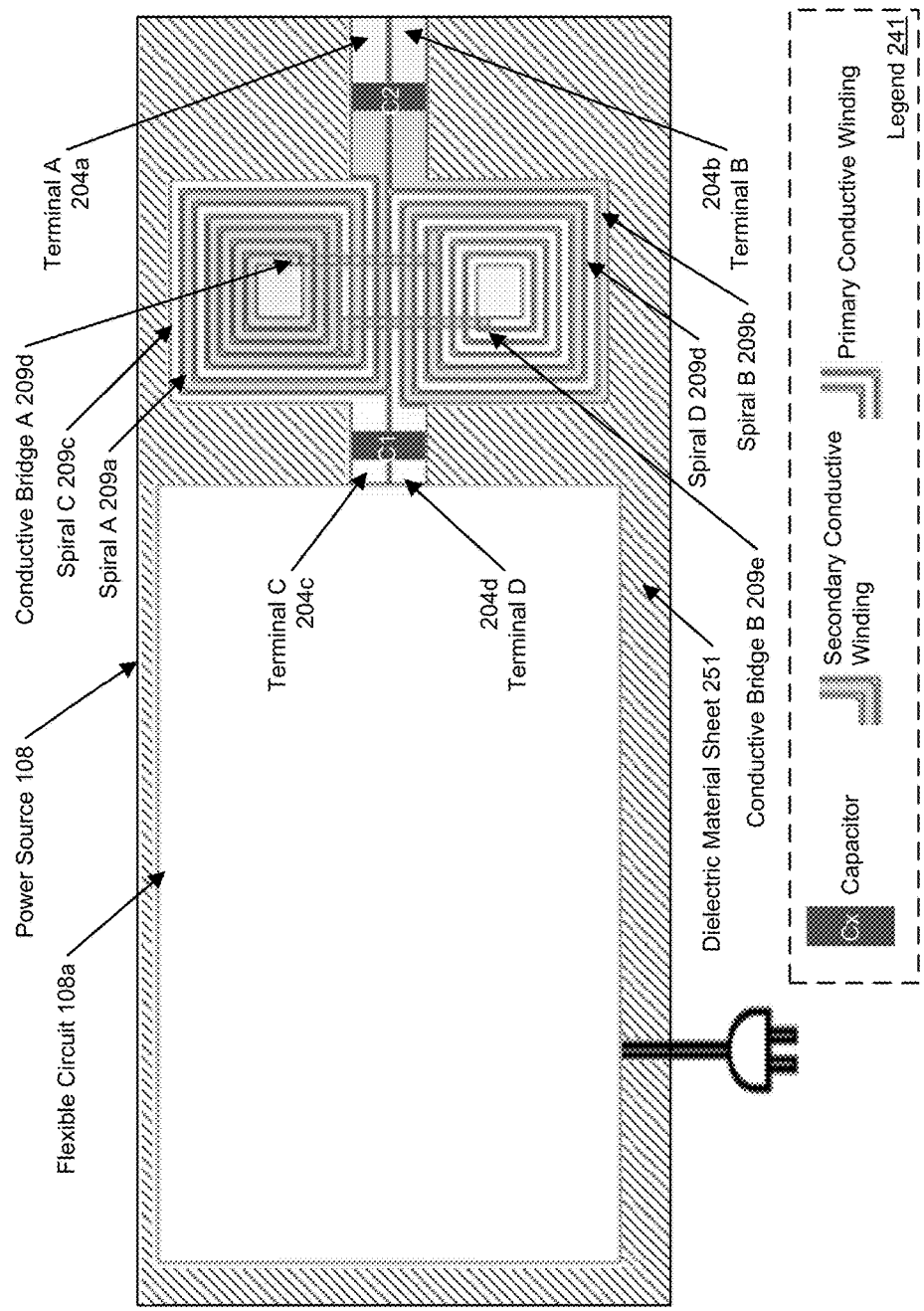

As shown in FIG. 2M, the power source (108) includes a flexible circuit (108a) connected to several conductive strips attached to a surface of the dielectric material sheet (251). The conductive strips include a spiral A (209a), a spiral B (209b), a spiral C (209c), and a spiral D (209d). One end of the spiral A (209a) is designated as the terminal A (204a), one end of the spiral B (209b) is designated as the terminal B (204b), one end of the spiral C (209c) is designated as the terminal C (204c), and one end of the spiral D (209d) is designated as the terminal D (204d). The other ends of the spiral A (209a) and spiral B (209b) are connected together using the conductive bridge A (209d) to implement a secondary winding of an isolation transformer contained in the power source (108). The other ends of the spiral C (209c) and spiral D (209d) are connected together using the conductive bridge B (209e) to implement a primary winding of the isolation transformer. The conductive bridge A (209d) and conductive bridge B (209e) may be implemented using insulated conductive wires or other electrical connection means. The primary and secondary windings intertwine with each other to provide an inductance coupling effect of the isolation transformer. In addition, certain capacitors (designated as $C_1$ and $C_2$) contained in the power source (108) may be connected to the terminal A (204a), terminal B (204b), terminal C (204c), and terminal D (204d). The capacitors $C_1$ and $C_2$ may be discrete capacitors soldered to the terminals or capacitors implemented using additional conductive strips attached to the two opposing surfaces of the dielectric material sheet (251). For example, the isolation transformer and the capacitors $C_1$ and $C_2$ may be part of or related to an impedance matching circuit to substantially match a predetermined output impedance of the power source (108) to the string of distributed capacitors in the rectangular loop (206a) depicted in FIG. 2L.

Figure 2N:
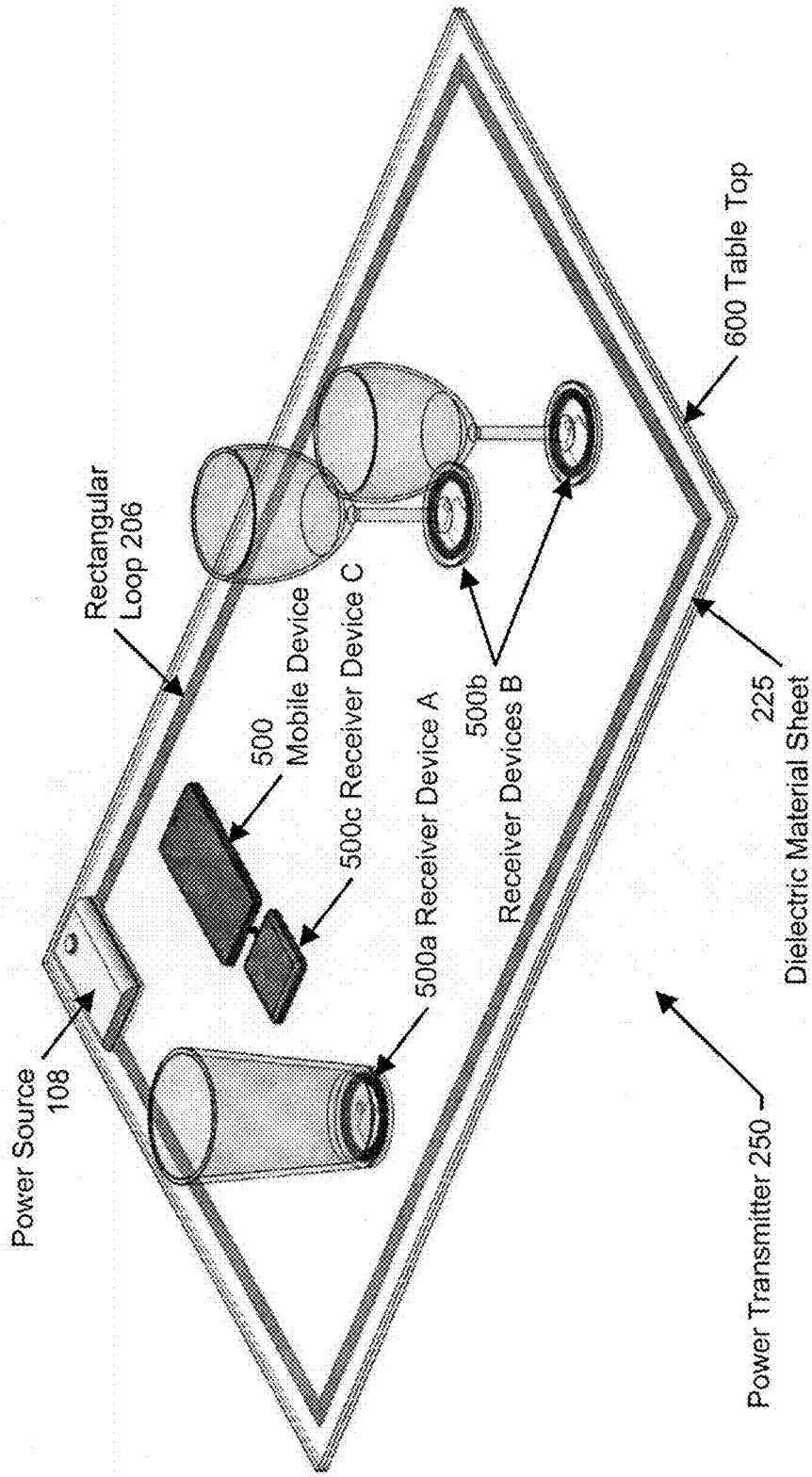

FIG. 2N shows an application example of a wireless power transfer area, based on the power transmitter (250) depicted in FIG. 2K above, in accordance with one or more embodiments. In one or more embodiments, one or more of the modules and elements shown in FIG. 2N may be omitted, repeated, and/or substituted. Accordingly, embodiments of the invention should not be considered limited to the specific arrangements of modules shown in FIG. 2N.

As shown in FIG. 2N, the wireless power transfer area includes the table top (600) where the rectangular loop (206) of the power transmitter (250) follows the edges of the table top (600). The dielectric material sheet (225) is laid on top of the table top (600) where the thickness is omitted for clarity. The power cord and plug of the power source (108) are also omitted. The receiver device A (500a) and receiver devices B (500b) receive wireless power transfer from the power transmitter (250) to light up a string of decorative light emitting diodes (LEDs) attached to the bottoms of glasses. Examples of the receiver device A (500a) and receiver devices B (500b) are described in reference to FIGS. 5A, 5B, 5D, and 5E below. In addition, the receiver device C (500c) is a commercially available product that receives wireless power transfer from the power transmitter (250) to charge the battery of a mobile device (500), such as a mobile phone, tablet computer, notebook computer, etc. TABLE 3 shows input power and input current for four example loading scenarios of the power transmitter (250).

TABLE 3

| Input power (W) | Input current (A) | Number of Load |
| --- | --- | --- |
| 23.23 | 1.96 | 0 |
| 23.80 | 2.01 | 1 LED |
| 24.82 | 2.10 | 2 LED |
| 25.63 | 2.17 | 3 LED |
| 28.38 | 2.17 | 3 LED + battery charger |

Figure 2P:
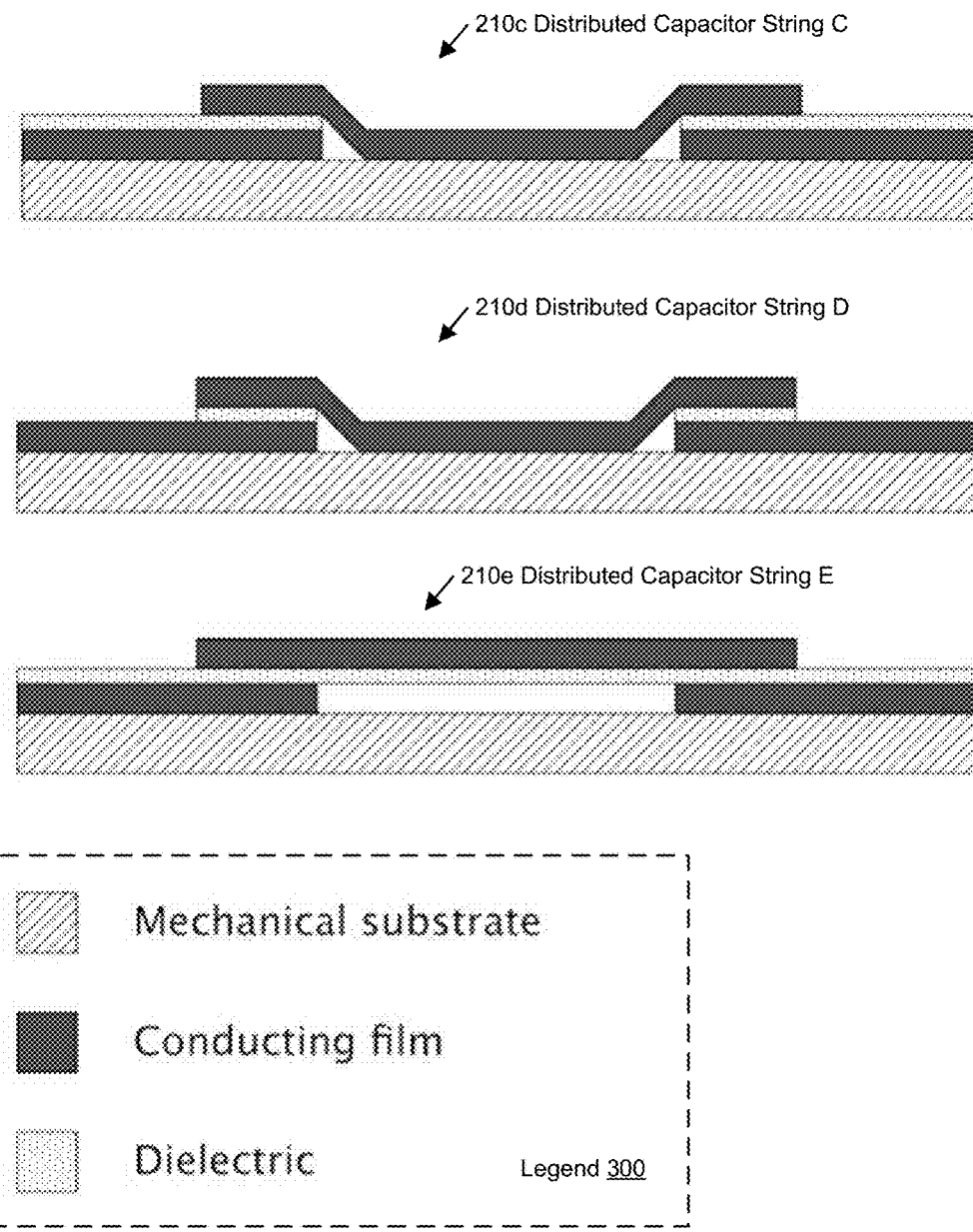

Similar to the distributed capacitor string A (210a) and distributed capacitor string B (210b) depicted in FIG. 2J above, FIG. 2P shows additional constructions of the variable form factor transmitter in accordance with one or more embodiments. In particular, overlapping portions of the two conducting films correspond to capacitors while non-overlapping portions of either conducting film correspond to inductors. In one or more embodiments, one or more of the modules and elements shown in FIG. 2P may be omitted, repeated, and/or substituted. Accordingly, embodiments of the invention should not be considered limited to the specific arrangements of modules shown in FIG. 2P.

As shown in FIG. 2P, the distributed capacitor string C (210c), distributed capacitor string D (210d), and distributed capacitor string E (210e) are three additional example constructions of the variable form factor transmitter (102) depicted in FIGS. 1A and 1B above. According to the legend (300), the dielectric is a layer which separates two layers of conducting film. The mechanical support is not provided by the dielectric, but rather by a separate and distinct insulating mechanical substrate that is shown below both the conducting film layers and the dielectric layer. The dielectric may include an oxide layer grown on the surface of one of the layers of conducting film, which may be a metallic conductor. The dielectric layer may cover the entire upper surface of the lower conducting layer, as shown in the distributed capacitor string C (210c), or may only cover the region of overlap, as shown in the distributed capacitor string D (210d).

Alternatively, as shown in the distributed capacitor string E (210e), the dielectric may consist of a thin film of insulating material to which both the upper and lower conducting films adhere. However, the dielectric may be too thin to provide adequate mechanical support, in which case all three layers may be superposed above an additional insulating layer, which provides mechanical support of the dielectric and upper/lower conducting films.

Figure 4A:
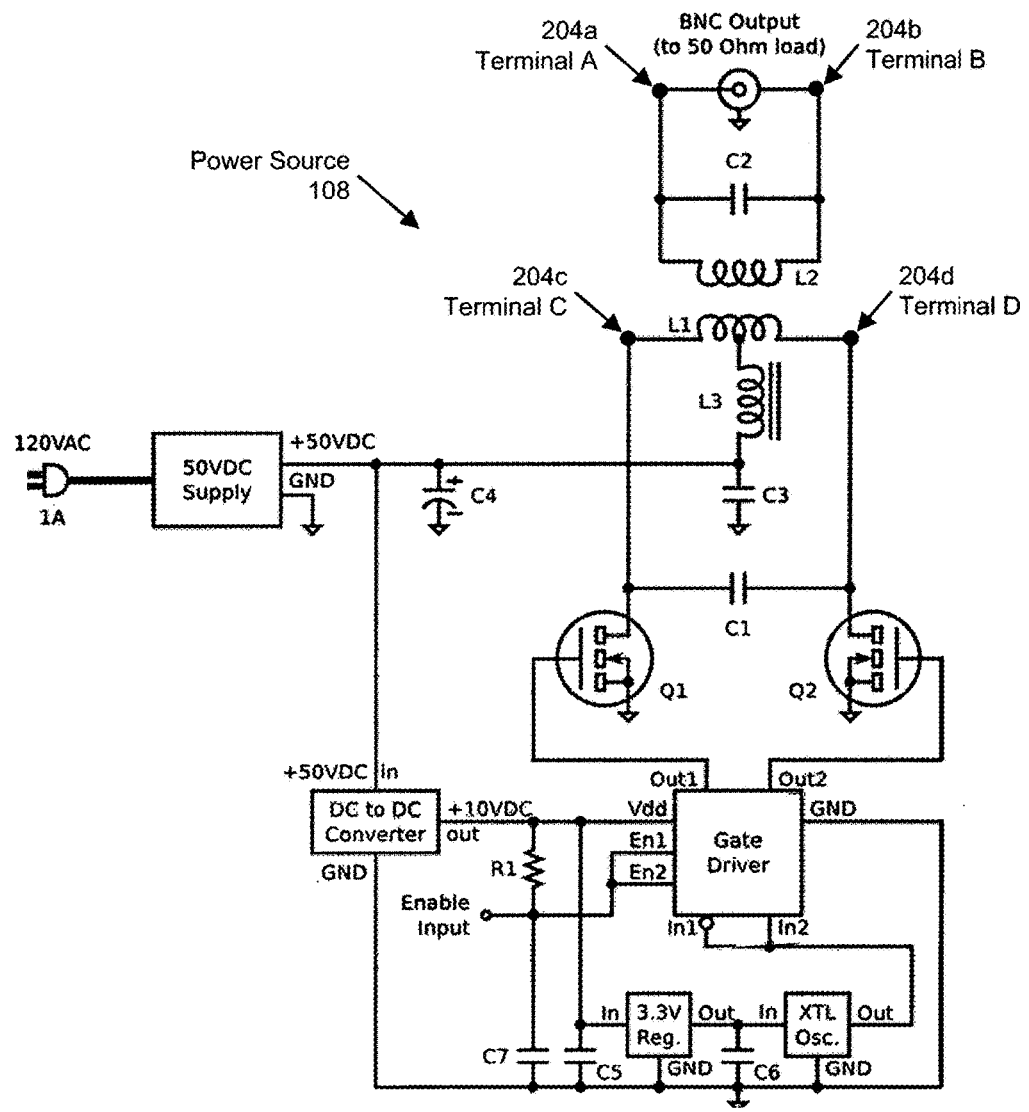
FIGS. 4A and 4B show schematic diagrams of example radio frequency (RF) power sources in accordance with one or more embodiments of the invention.

FIG. 4A shows a schematic diagram of an example RF power source in accordance with one or more embodiments of the invention. In particular, the example RF power source (108) shown in FIG. 4A may operate based on the ISM band as the power source (108) depicted in FIGS. 1A, 1C, 2B, 2C, 2D, 2K, 2L, and 2M above. Specifically, the example RF power source (108) shown in FIG. 4A includes the terminal A (204a) and terminal B (204b) that correspond to the two terminals of the power source (108) depicted in FIGS. 1A, 1C, 2B, 2C, 2D, 2K, 2L, and 2M above. The schematic diagram includes capacitors, inductors, and resistors of various $R_L$ C circuit components and commercial part numbers of various integrated circuit components. In particular, the inductors designated as $L_1$ and $L_2$ correspond to the primary conductive winding and secondary conductive winding shown in FIG. 2M above. The capacitors designated as $C_1$ and $C_2$ correspond to like-named capacitors shown in FIG. 2M above. In one or more embodiments, one or more of the modules and elements shown in FIG. 4A may be omitted, repeated, and/or substituted. Accordingly, embodiments of the invention should not be considered limited to the specific arrangements of modules shown in FIG. 4A.

Figure 4B:
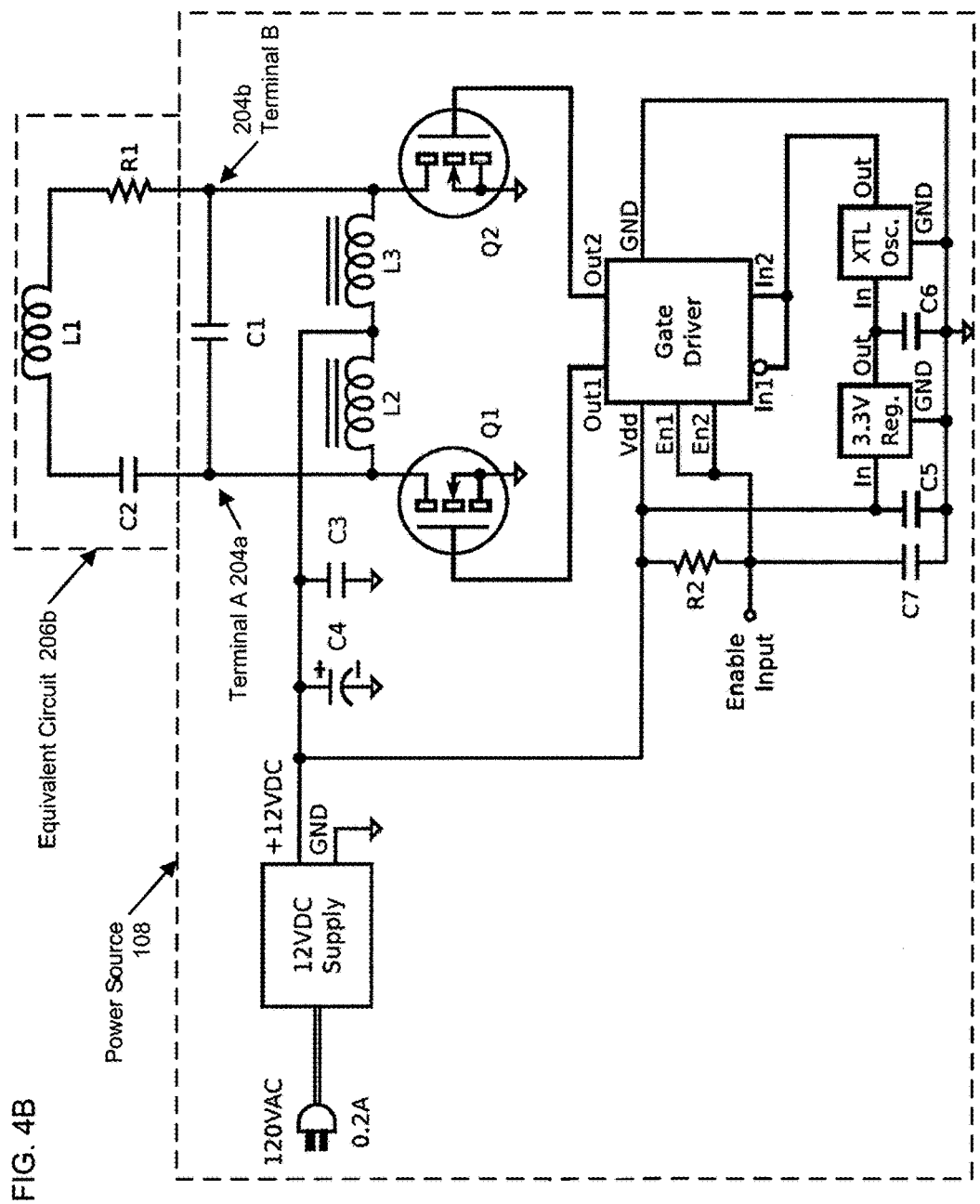

FIG. 4B shows a schematic diagram of an example RF power source connected to an equivalent circuit in accordance with one or more embodiments of the invention. In particular, the example RF power source (108) shown in FIG. 4B may operate based on the ISM band as the power source (108) depicted in FIGS. 1A, 1C, 2B, 2C, 2D, 2K, and 2L above. Specifically, the example RF power source (108) shown in FIG. 4B includes the terminal A (204a) and terminal B (204b) that correspond to the two terminals of the power source (108) depicted in FIGS. 1A, 1C, 2B, 2C, 2D, 2K, and 2L above. The schematic diagram includes capacitors, inductors, and resistors of various $R_L$ C circuit components and commercial part numbers of various integrated circuit components. In particular, the equivalent circuit (206b) represents the rectangular loop (206) or rectangular loop (206a) shown in FIGS. 2K and 2L above. In one or more embodiments, one or more of the modules and elements shown in FIG. 4B may be omitted, repeated, and/or substituted. Accordingly, embodiments of the invention should not be considered limited to the specific arrangements of modules shown in FIG. 4B.

Figure 5A:
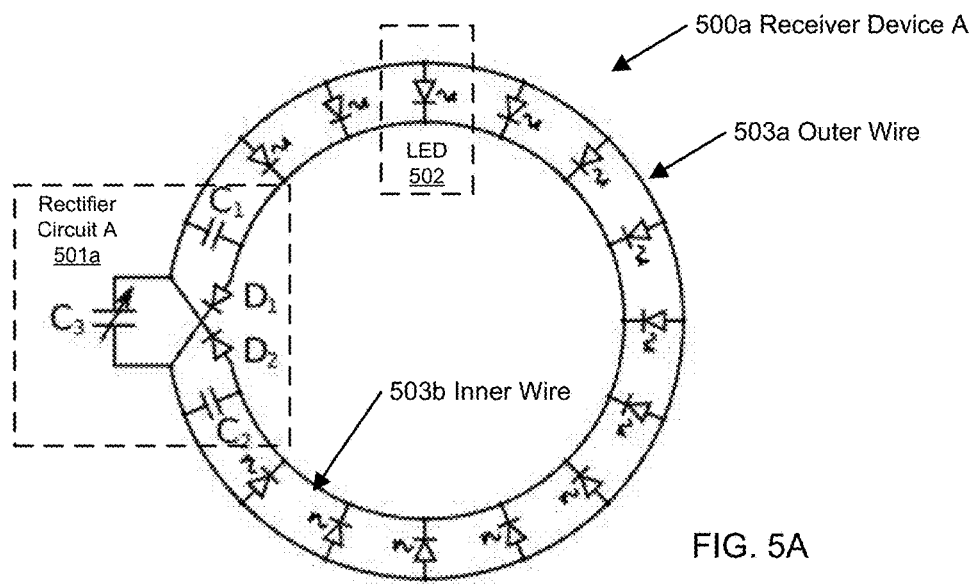
FIGS. 5A, 5B, 5C, 5D, and 5E show schematic and layout diagrams of example receiver devices in accordance with one or more embodiments of the invention.

FIG. 5A shows a schematic diagram of an example receiver device A (500a) in accordance with one or more embodiments of the invention. In one or more embodiments, one or more of the modules and elements shown in FIG. 5A may be omitted, repeated, and/or substituted. Accordingly, embodiments of the invention should not be considered limited to the specific arrangements of modules shown in FIG. 5A.

As shown in FIG. 5A, the receiver device A (500a) includes multiple light emitting diodes (LEDs) (e.g., LED (502)) that are connected in parallel to form an LED string. The two ends of the LED string are connected to a rectifier circuit A (501a) to form a loop. For example, the loop may be a circular loop used as a mobile LED lighting device used within the wireless power transfer area (101) depicted in FIG. 1A above. In one or more embodiments of the invention, the rectifier circuit A (501a) includes capacitors $C_1$, $C_2$, and $C_3$ and rectifying diodes $D_1$ and $D_2$. When the receiver device A (500a) is in the presence of the oscillating magnetic fields, the changing magnetic flux through the loop of the LED string induces a voltage difference between the two ends of the LED string. The induced voltage difference oscillates with time. The capacitance $C_3$ is adjusted to bring the LED string into resonance with the oscillating magnetic fields to enhance the induced oscillating voltage. The rectifying diodes $D_1$ and $D_2$ rectify the induced oscillating voltage to produce a DC voltage difference between the outer wire (503a) and inner wire (503b) of the LED string thereby deliver power to the parallel-connected LEDs (e.g., LED (502)). The capacitors $C_1$ and $C_2$ act as RF bypass capacitors to maintain the outer wire (503a) and inner wire (503b) of the LED string appear shorted to the RF current. The configuration of the receiver device A (500a) limits the loop voltage by the combined forward voltage drop across the LEDs in series with the rectifying diode $D_1$ or $D_2$, which improves safety to the user.

Figure 5B:
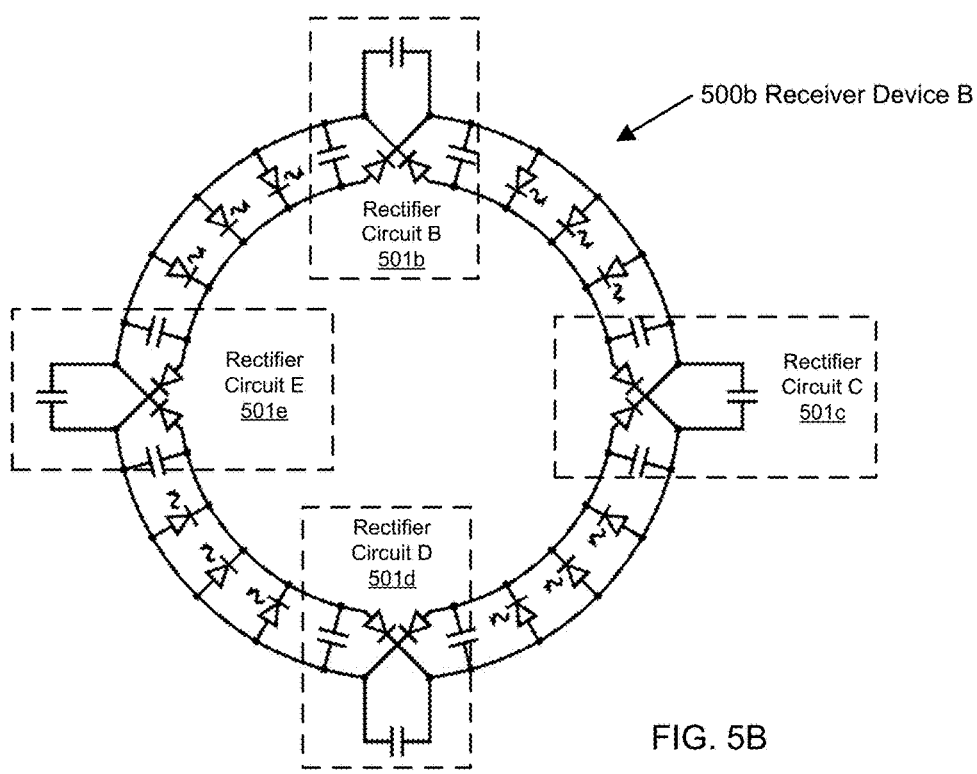

Similar to FIG. 5A, FIG. 5B shows an example receiver device B (500b), which is a larger version of the receiver device A (500a) that has multiple rectifier circuits (i.e., rectifier circuit B (501b), rectifier circuit C (501c), rectifier circuit D (501d), rectifier circuit E (501e)). The operation of the receiver device B (500b) is substantially the same as the receiver device A (500a). The number of segments in the receiver device B (500b) may be chosen to provide an optimal impedance match to the load, i.e., the parallel-connected LEDs.

Figure 5C:
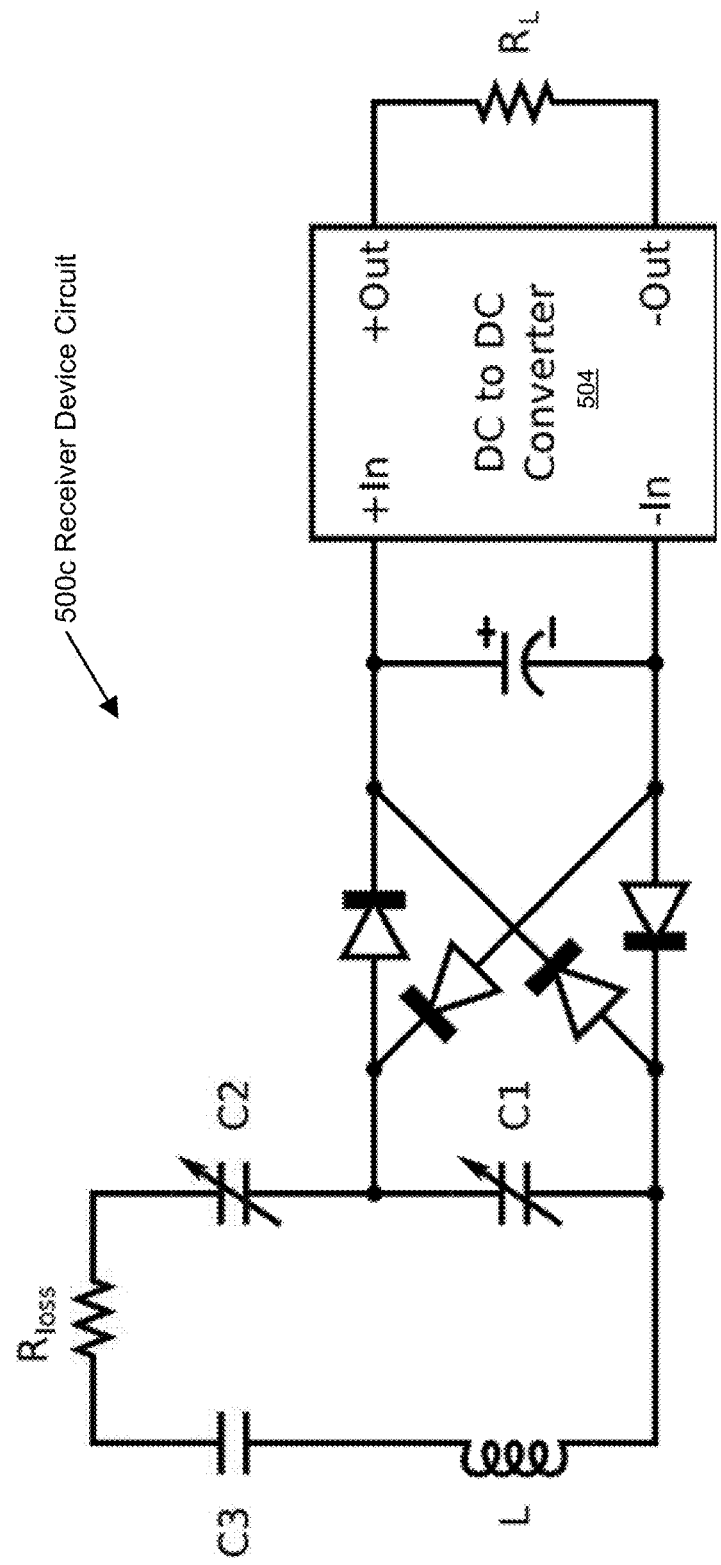

In addition to FIGS. 5A and 5B, FIG. 5C shows a schematic diagram of other example receiver devices.

FIG. 5C shows a schematic diagram of an example receiver device circuit (500c) in accordance with one or more embodiments of the invention. In one or more embodiments, the receiver device circuit (500c) is employed in various types of receiver devices having different shapes, sizes, form factors, etc. for various different types of mobile or stationery applications within the wireless power transfer area (101) depicted in FIG. 1A above. In one or more embodiments, at least the inductor, L, of the receiver device circuit (500c) is placed within the wireless power transfer area (101) for receiving the wireless power transfer. The remaining components shown in FIG. 5C are configured to convert the received wireless power to suitable format to be consumed by a load, represented by the resistance, $R_L$.

As shown in FIG. 5C, the inductor, L, along with capacitors, $C_1$, $C_2$, and $C_3$, are tuned to resonate at the characteristic frequency of the variable form factor transmitter (102) and the RF power source (108) described in reference to FIGS. 1A through 2G above. The value of capacitor $C_1$ is chosen to provide an impedance match between the resonant receiver and the input of the DC-to-DC converter (504). The DC-to-DC converter (504) transforms the rectified voltage into a constant voltage to drive the load, $R_L$. The DC-to-DC converter (504) allows the receiver device circuit (500c) to present a constant voltage to the load $R_L$ even in situations where the receiver device circuit (500c) is moved through regions of varying magnetic field strength within the wireless power transfer area (101). Note that the load $R_L$ need not be a linear device, i.e., a device with a linear voltage versus current relation. Examples of load $R_L$ include, but are not limited to, LED's, microcontrollers, motors, sensors, actuators, etc.

Figure 5D:
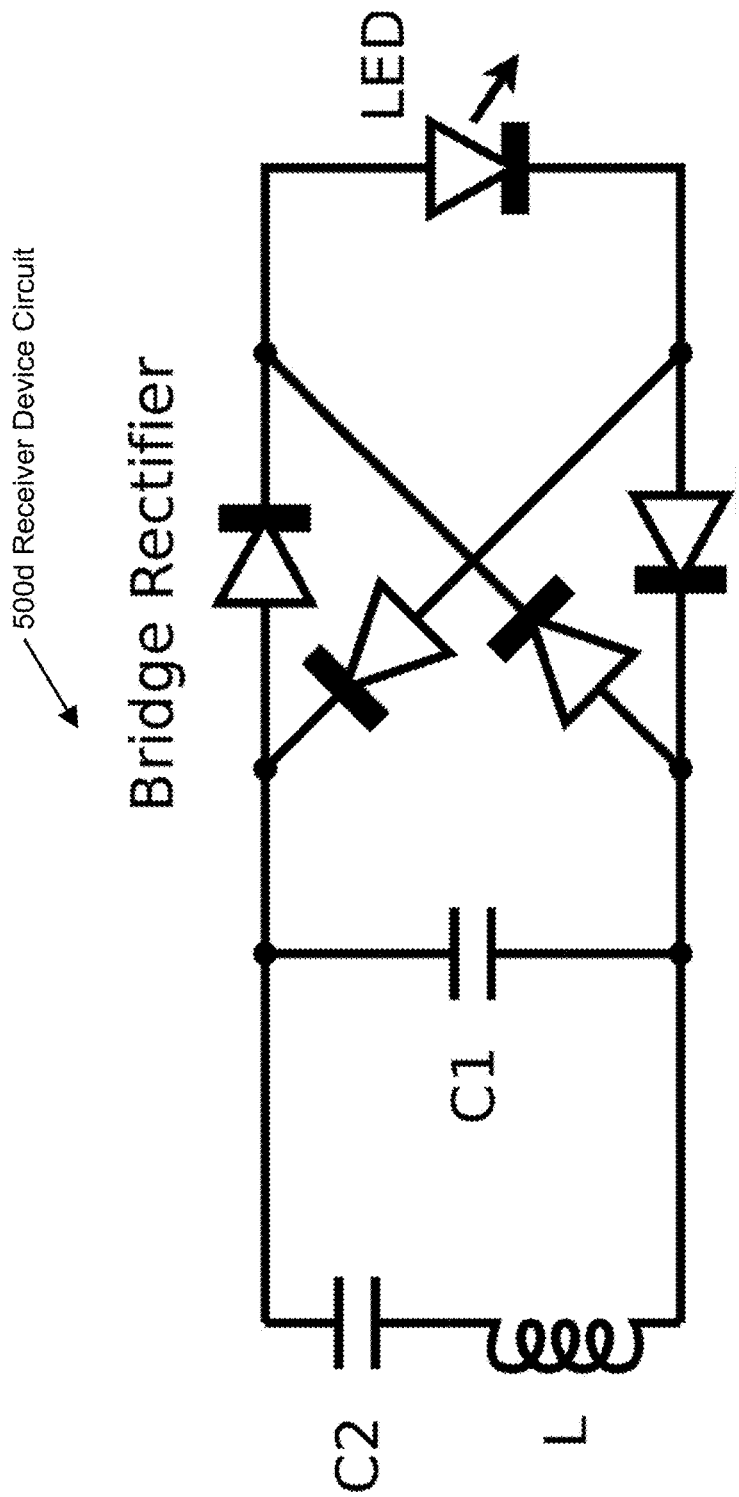

FIG. 5D shows a schematic diagram of an additional example receiver device circuit (500d) in accordance with one or more embodiments of the invention. The inductor, L, along with capacitors, $C_1$ and $C_2$, are tuned to resonate at the characteristic frequency of the variable form factor transmitter (102) and the RF power source (108) described in reference to FIGS. 1A through 2G above. The value of capacitor $C_1$ is chosen to provide an impedance match between the resonant receiver and the LED load. The bridge rectifier converts the RF voltage present on capacitor $C_1$ into a DC voltage, which drives the LED. For example, the LED may correspond to the string of decorative light emitting diodes (LEDs) attached to the bottoms of glasses, depicted in FIG. 2N above.

Figure 5E:
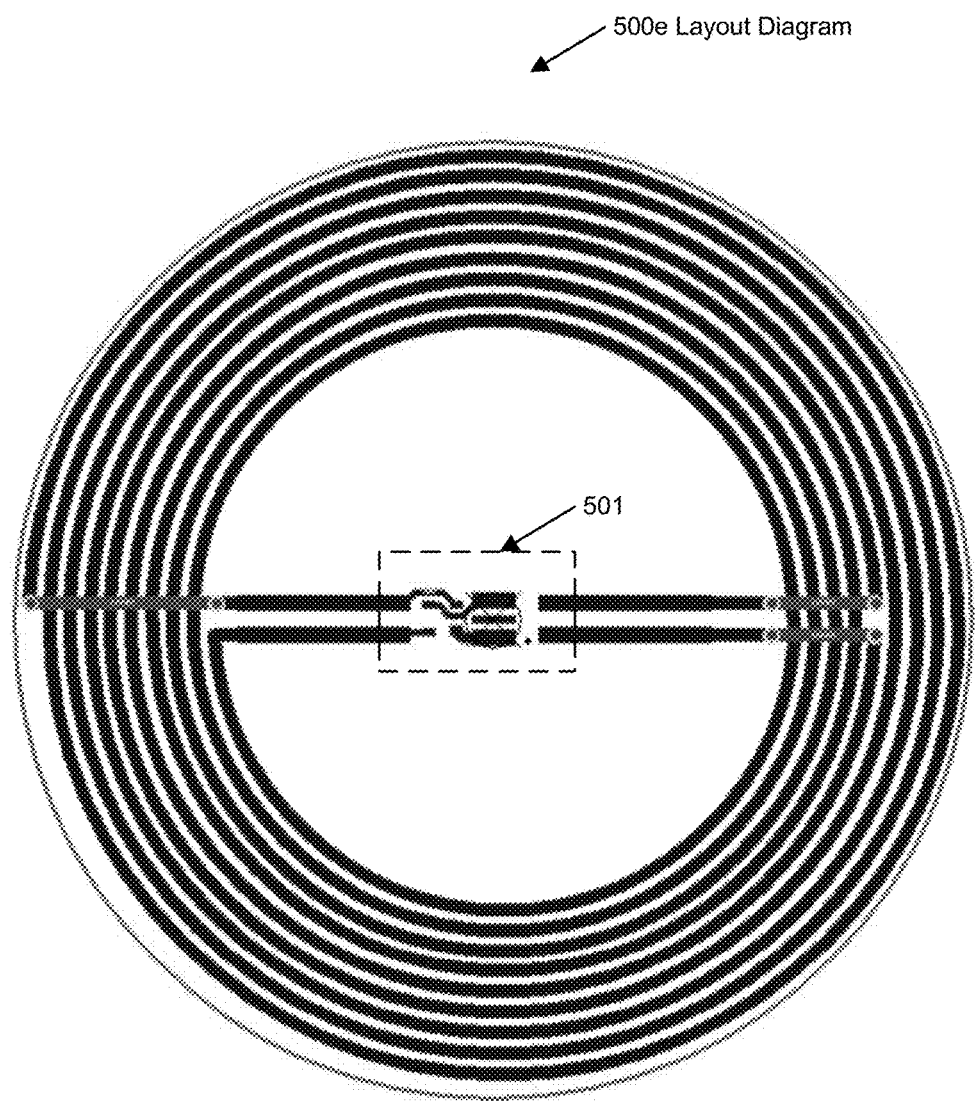

FIG. 5E shows a layout diagram (500e) of the example receiver device circuit (500d) depicted in FIG. 5D above. The inductor, L, is composed of a conducting trace on the surface of a printed circuit board (PCB) in the form of a flat spiral with multiple turns. Capacitors, $C_1$ and $C_2$, are placed in series with this spiral at the location (501). A second layer of traces is used on the PCB to allow connections to jump over multiple turns of the inductor, L. Note also that $C_1$ and $C_2$ can be placed in series with the turns of the inductor, L, at any point. In FIG. 5E, for example, the capacitor, $C_2$, is placed across a break in the center of the inductor, L. This placement helps to maintain symmetry in the distribution of voltage on the turns of the inductor, L.

In one or more embodiments of the invention, the receiver device A (500a), receiver device B (500b), receiver device circuit (500c), or receiver device circuit (500d) may receive power wirelessly from any electromagnetic transmitter, such as a dipole transmitter (e.g., magnetic dipole transmitter), a loop antenna with distributed capacitance, a parallel-wire transmission line with distributed capacitance, a shielded transmission line with distributed capacitance, etc. In one or more embodiments of the invention, the receiver device A (500a), receiver device B (500b), receiver device circuit (500c), and/or or receiver device circuit (500d) are placed within the wireless power transfer area (101) as the receiver device (A), receiver device (B), receiver device (C), receiver device (D), receiver device (E), or receiver device (F) to receive power wirelessly from the variable form factor transmitter (102).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A power transmitter for wireless power transfer, comprising:
   a dielectric material sheet encompassing at least a path based on a wireless power transfer area;
   a plurality of capacitors disposed along the path and mechanically supported by the dielectric material sheet; and
   a plurality of inductive segments disposed along the path and mechanically supported by the dielectric material sheet,
   wherein the plurality of capacitors are connected in series via at least the plurality of inductive segments into a string of distributed capacitors, and
   wherein the power transmitter is configured to:
      transmit, from a radio frequency (RF) power source and based at least in part on inducing a receiver device into resonance at a characteristic frequency of the string of distributed capacitors, RF power across the wireless power transfer area via a near electromagnetic field of the string of distributed capacitors.

2. The power transmitter of claim 1,
   wherein a capacitor of the plurality of capacitors comprises a first conductive strip and a second conductive strip attached to a first surface and a second surface, respectively, of the dielectric material sheet, and
      wherein a first inductive segment of the plurality of inductive segments comprises a third conductive strip attached to the first surface.

3. The power transmitter of claim 2,
   wherein the capacitor and the first inductive segment are connected to each other in the string of distributed capacitors,
   wherein the first conductive strip and the third conductive strip are integrated as a first single conductive strip attached to the first surface, and
   wherein the capacitor comprises a first capacitance based on a first overlap area between the single conductive strip attached to the first surface and the second conductive strip attached to the second surface.

4. The power transmitter of claim 3,
   wherein the capacitor and a second inductive segment of the plurality of inductive segments are connected to each other in the string of distributed capacitors,
   wherein the second inductive segment comprises a sixth conductive strip attached to the second surface, and
   wherein the second conductive strip and the sixth conductive strip are integrated as a second single conductive strip attached to the second surface.

5. The power transmitter of claim 3,
   wherein the capacitor and a second inductive segment of the plurality of inductive segments are connected to each other in the string of distributed capacitors,
   wherein the second inductive segment comprises a sixth conductive strip attached to the first surface, and
   wherein the capacitor further comprises a second capacitance based on a second overlap area between the second conductive strip and the sixth conductive strip.

6. The power transmitter of claim 2,
   wherein at least one dimension of the wireless power transfer area is smaller than a free-space wavelength of the characteristic frequency to suppress radiation in a far electromagnetic field of the power transmitter, and
   wherein the characteristic frequency is based at least on an overlap area of the first conductive strip and the second conductive strip, a form factor of the third conductive strip, a thickness and dielectric constant of the dielectric material sheet.

7. The power transmitter of claim 1,
   wherein a portion of the RF power transmitted via the power transmitter from the RF power source is received by a plurality of receiver devices within the wireless power transfer area,
   wherein the characteristic frequency is substantially independent of a number or placement of the plurality of receiver devices, and
   wherein the plurality of receiver devices comprise a receiving antenna substantially smaller than an area encompassed by the string of distributed capacitors.

8. The power transmitter of claim 7,
   wherein the wireless power transfer area comprises at least a portion of a table top surface, and
   wherein the plurality of receiver devices comprise at least one mobile receiver device disposed on the portion of the table top surface to receive the portion of the RF power.

9. The power transmitter of claim 7,
   wherein the wireless power transfer area comprises a space adjacent to a window, and
   wherein the plurality of receiver devices comprise at least one mobile receiver device disposed about the space to receive the portion of the RF power.

10. The power transmitter of claim 9,
    wherein the dielectric material sheet is integrated in the window.

11. The power transmitter of claim 2, further comprising:
    an impedance matching circuit coupled to the string of distributed capacitors, wherein the impedance matching circuit comprises a fourth conductive strip attached to one of the first surface and the second surface,
    wherein the fourth conductive strip comprises a form factor such that an input impedance of a combination of the impedance matching circuit and the string of distributed capacitors substantially matches a pre-determined output impedance of the RF power source.

12. The power transmitter of claim 11,
    wherein the form factor of the fourth conductive strip comprises a coil shape that is intertwined with a fifth conductive strip comprised in the impedance matching circuit, and
    wherein the impedance matching circuit is configured to match the input impedance to the pre-determined output impedance such that the power source is compatible with multiple power transmitters having different form factors.

13. A system for wireless power transfer, comprising:
    a radio frequency (RF) power source;
    a dielectric material sheet encompassing at least a path based on a wireless power transfer area;
    a plurality of capacitors disposed along the path and mechanically supported by the dielectric material sheet; and a plurality of inductive segments disposed along the path and mechanically supported by the dielectric material sheet, wherein the plurality of capacitors are connected in series via at least the plurality of inductive segments into a string of distributed capacitors, and wherein the power transmitter is configured to:
 transmit, from the RF power source and based at least in part on inducing a receiver device into resonance at a characteristic frequency of the string of distributed capacitors, RF power across the wireless power transfer area via a near electromagnetic field of the string of distributed capacitors.

14. The system of claim 13,
wherein a capacitor of the plurality of capacitors comprises a first conductive strip and a second conductive strip attached to a first surface and a second surface, respectively, of the dielectric material sheet, and
wherein a first inductive segment of the plurality of inductive segments comprises a third conductive strip attached to the first surface.

15. The system of claim 14,
wherein the capacitor and the first inductive segment are connected to each other in the string of distributed capacitors,
wherein the first conductive strip and the third conductive strip are integrated as a first single conductive strip attached to the first surface, and
wherein the capacitor comprises a first capacitance based on a first overlap area between the single conductive strip attached to the first surface and the second conductive strip attached to the second surface.

16. The system of claim 15,
wherein the capacitor and a second inductive segment of the plurality of inductive segments are connected to each other in the string of distributed capacitors,
wherein the second inductive segment comprises a sixth conductive strip attached to the second surface, and
wherein the second conductive strip and the sixth conductive strip are integrated as a second single conductive strip attached to the second surface.

17. The system of claim 15,
wherein the capacitor and a second inductive segment of the plurality of inductive segments are connected to each other in the string of distributed capacitors,
wherein the second inductive segment comprises a sixth conductive strip attached to the first surface, and
wherein the capacitor further comprises a second capacitance based on a second overlap area between the second conductive strip and the sixth conductive strip.

18. The system of claim 14,
wherein at least one dimension of the wireless power transfer area is smaller than a free-space wavelength of the characteristic frequency to suppress radiation in a far electromagnetic field of the power transmitter, and
wherein the characteristic frequency is based at least on an overlap area of the first conductive strip and the second conductive strip, a form factor of the third conductive strip, a thickness and dielectric constant of the dielectric material sheet.

19. The system of claim 13,
wherein a portion of the RF power transmitted via the power transmitter from the RF power source is received by a plurality of receiver devices within the wireless power transfer area,
wherein the characteristic frequency is substantially independent of a number or placement of the plurality of receiver devices, and
wherein the plurality of receiver devices comprise a receiving antenna substantially smaller than an area encompassed by the string of distributed capacitors.

20. The system of claim 19,
wherein the dielectric material sheet is mechanically supported by a table top surface,
wherein the wireless power transfer area comprises at least a portion of the table top surface, and
wherein the plurality of receiver devices comprise at least one mobile receiver device disposed on the table top surface to receive the portion of the RF power.

* * * * *